(12) United States Patent
Kim et al.

(10) Patent No.: US 12,473,210 B2
(45) Date of Patent: Nov. 18, 2025

(54) WATER PURIFYING APPARATUS AND REFRIGERATOR HAVING THE SAME

(71) Applicant: LG Electronics Inc., Seoul (KR)

(72) Inventors: Youngjae Kim, Seoul (KR); Soongy Jeong, Seoul (KR); Uison Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 378 days.

(21) Appl. No.: 17/976,458

(22) Filed: Oct. 28, 2022

(65) Prior Publication Data

US 2023/0144077 A1 May 11, 2023

(30) Foreign Application Priority Data

Nov. 11, 2021 (KR) .................. 10-2021-0154735

(51) Int. Cl.
*C02F 1/00* (2023.01)
*F25D 23/00* (2006.01)

(52) U.S. Cl.
CPC .............. *C02F 1/003* (2013.01); *F25D 23/00* (2013.01); *C02F 2201/004* (2013.01); *C02F 2201/005* (2013.01); *C02F 2307/10* (2013.01); *F25D 2323/121* (2013.01)

(58) Field of Classification Search
CPC ................ C02F 1/003; C02F 2201/004; C02F 2307/10; C02F 1/283; C02F 1/44; C02F 2201/006; C02F 2307/12; F25D 23/00; F25D 2323/121; F25D 23/126; B01D 2201/302; B01D 29/56; B01D 29/60; B01D 29/90; B01D 29/92; B01D 29/96; B01D 35/306; B01D 2201/304
See application file for complete search history.

(56) References Cited

U.S. PATENT DOCUMENTS

2007/0284296 A1* 12/2007 Swain ................ C02F 9/20
 210/235
2017/0261253 A1* 9/2017 Mitchell ............ F25D 23/126

FOREIGN PATENT DOCUMENTS

| CN | 108905338 A | 11/2018 |
|---|---|---|
| KR | 20-2015-0002961 U | 7/2015 |
| KR | 20150135021 | 12/2015 |
| KR | 10-2018-0100537 A | 9/2018 |

OTHER PUBLICATIONS

Office Action in Chinese Appln. No. 202211336406.8, mailed on May 31, 2025, 14 pages (with English translation).

* cited by examiner

*Primary Examiner* — Terry K Cecil
(74) *Attorney, Agent, or Firm* — Fish & Richardson P.C.

(57) ABSTRACT

A water purifying apparatus includes a head that is configured to couple to a filter and defines a water inlet and a water outlet, and a shaft provided inside the head, rotatably mounted between the water inlet and the water outlet, and having a filtering passage configured to connect the water inlet to the water outlet so that water introduced into the water inlet is discharged to the water outlet via the filter. The shaft includes a shaft inlet and a shaft outlet, which are opened to respectively communicate with the water inlet and the water outlet so as to define the filtering passage, and a water inlet blocking portion and a water outlet blocking portion, which are provided between the shaft inlet and the shaft outlet to shield opened surfaces of the water inlet and the water outlet.

20 Claims, 17 Drawing Sheets

WATER PURIFYING APPARATUS AND REFRIGERATOR HAVING THE SAME

CROSS-REFERENCE TO RELATED APPLICATIONS

The present application claims priority under 35 U.S.C. 119 and 35 U.S.C. 365 to Korean Patent Application No. 10-2021-0154735, filed on Nov. 11, 2021, which is hereby incorporated by reference in its entirety.

BACKGROUND

The present disclosure relates to a water purifying apparatus and a refrigerator having the same.

In general, a water purifying apparatus is configured to purify supplied water using a filter or a filter medium and includes a device that purifies water in a water tube or a tank into a drinkable state.

Such a water purifying apparatus that supplies drinkable water is representative of a water purifier. Recently, the whole or a portion of the water purifying apparatus may be provided in a refrigerator to receive purified water through the refrigerator or make ice using the purified water.

In a refrigerator provided with a water purifying apparatus, it is necessary to replace or inspect a filter constituting the water purifying apparatus as necessary, and for this purpose, the filter is configured to be detachable. In addition, the water purifying apparatus may have a bypass structure capable of supplying water even in a state in which the filter is separated, thereby supplying water during the replacement or inspection of the filter.

A head for a water purifying filter having such a bypass structure is disclosed in Korean Patent Publication No. 10-2015-0135021.

However, in the case of the water purifying apparatus having the bypass structure according to the related art, water may be discharged from the water purifying apparatus even when the filter is not installed. There is a limitation in that a user may drink unfiltered water by mistakenly thinking that the filter is in a state in which the filter is installed even through the filter is not installed.

SUMMARY

Embodiments provide a water purifying apparatus in which water passing through a filter is discharged only when the filter is installed, but is not discharged when the filter is not mounted, and a refrigerator including the same.

Embodiments also provide a water purifying apparatus in which a passage between a water inlet, which communicates with a filter so that water is introduced, and a water outlet, which communicates with the filter so that water is discharged, increases in area to increase in filtering flow rate and a refrigerator including the same.

In one embodiment, a water purifying apparatus includes: a filter configured to discharge introduced water after purifying the introduced water; a head to which the filter is detachably coupled and which includes a water inlet and a water outlet; and a shaft provided inside the head, rotatably mounted between the water inlet and the water outlet, and having a filtering passage configured to connect the water inlet to the water outlet so that water introduced into the water inlet is discharged to the water outlet via the filter, wherein the shaft includes: a shaft inlet and a shaft outlet, which are opened to respectively communicate with the water inlet and the water outlet so as to define the filtering passage; and a water inlet blocking portion and a water outlet blocking portion, which are provided between the shaft inlet and the shaft outlet to shield opened surfaces of the water inlet and the water outlet.

In the state in which the filter is mounted on the head, the shaft inlet and the shaft outlet may be respectively aligned with the water inlet and the water outlet so that the water introduced into the water inlet is introduced to the filter, and, in the state in which the filter is separated from the head, the water inlet blocking portion and the water outlet blocking portion may be respectively aligned with the water inlet and the water outlet so that the introduction of the water, which is introduced into the water inlet, into the shaft is blocked.

The water inlet blocking portion may include a recess portion defined to be recessed inward from a circumferential surface of the shaft.

The shaft may include a sealing pad configured to shield the recess portion at a position corresponding to the water inlet blocking portion.

The water inlet blocking portion may include a protrusion configured to protrude in a direction of the sealing pad, and the sealing pad may include a coupling groove recessed from an inner surface that is in contact with the recess portion so that the protrusion is inserted to be coupled.

The sealing pad may include: an outer surface configured to face the inner surface; and a sealing portion configured to protrude along a circumference of the outer surface.

The inner surface may have a flat shape, and the outer surface may have a curved surface to be away from the shaft toward a center thereof.

The sealing portion may be provided between the water inlet and the water inlet blocking portion.

The water outlet blocking portion may include a recess portion recessed inward from a circumferential surface of the shaft.

The shaft may include a sealing pad configured to shield the recess portion at a position corresponding to the water outlet blocking portion, and the sealing pad may include: an inner surface that is in contact with the recess portion; and an outer surface configured to face the inner surface; and a sealing portion configured to protrude along a circumference of the outer surface.

The shaft may include: an upper part in which the shaft inlet, the shaft outlet, the water inlet blocking portion, and the water outlet blocking portion are provided; and a lower part extending downward from a lower end of the upper part, wherein the lower part may include: a stepped portion extending to be stepped downward from the lower end of the upper part; and an inner pipe extending downward from a lower end of the stepped portion.

A body seating portion on which the stepped portion is seated may be disposed inside the head, and a stepped portion O-ring may be provided between an outer surface of the stepped portion and an inner surface of the head.

The head may include: an upper body; a lower body of which a bottom surface is opened to accommodate the filter; and an inner body which is disposed inside the head and of which at least a portion is in contact with the shaft.

The inner body may be spaced a set distance from the inner pipe, and a lower end of the inner body may extend further downward than a lower end of the inner pipe.

Each of the shaft inlet and the shaft outlet may have a circular shape.

The details of one or more embodiments are set forth in the accompanying drawings and the description below. Other features will be apparent from the description and drawings, and from the claims.

DETAILED DESCRIPTION OF THE EMBODIMENTS

Hereinafter, detailed embodiments will be described in detail with reference to the accompanying drawings. However, the present disclosure is limited to the embodiments in which the spirit of the present invention is proposed, and other degenerate idea or other embodiments included in the scope of the present invention may be easily proposed by addition, changes, deletions, etc. of other elements.

Figure 1:
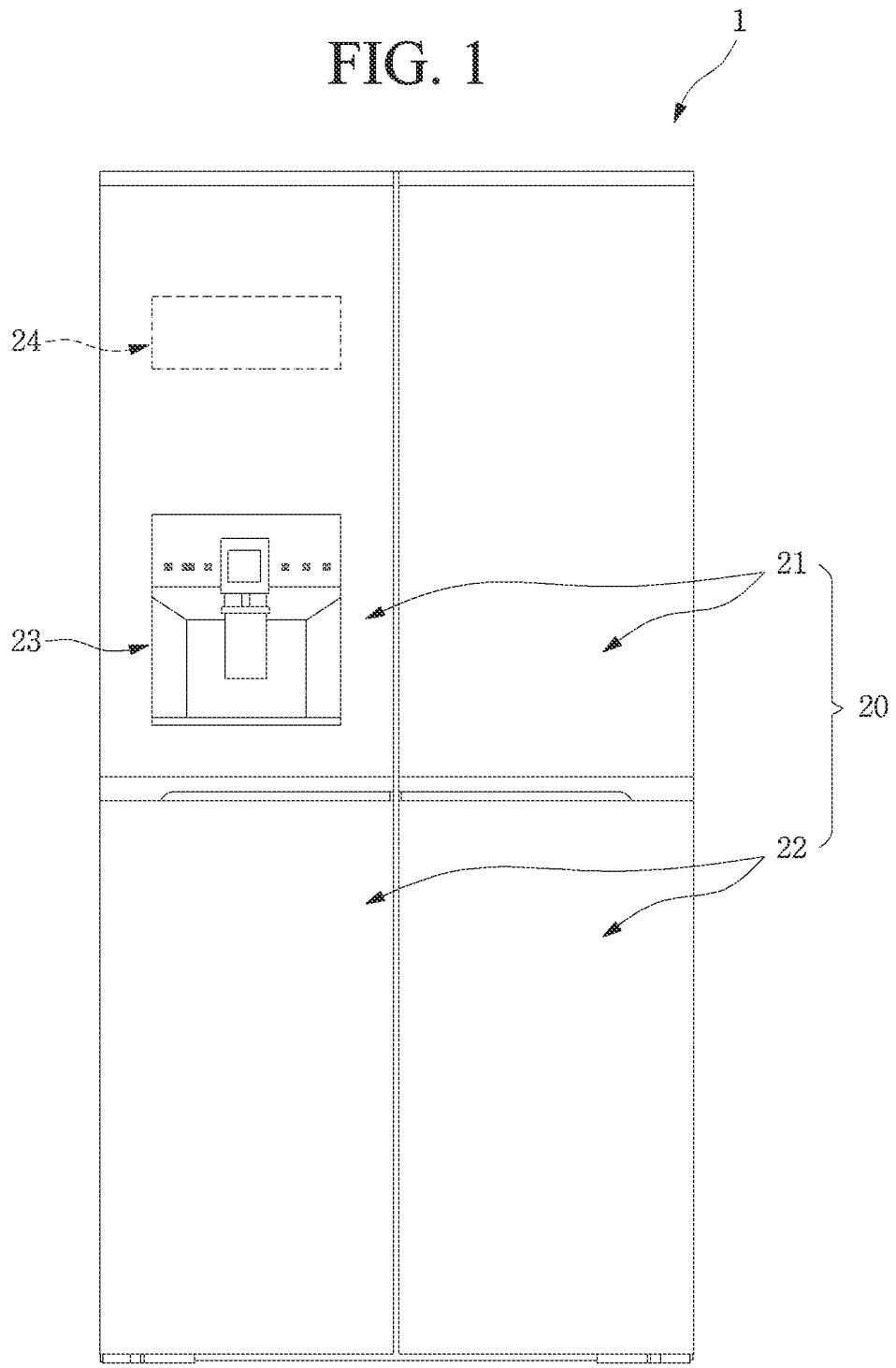
FIG. 1 is a front view of a refrigerator according to an embodiment.

FIG. 1 is a front view of a refrigerator according to an embodiment. Also, FIG. 2 is a front view illustrating a state in which a door of the refrigerator is opened.

Figure 2:
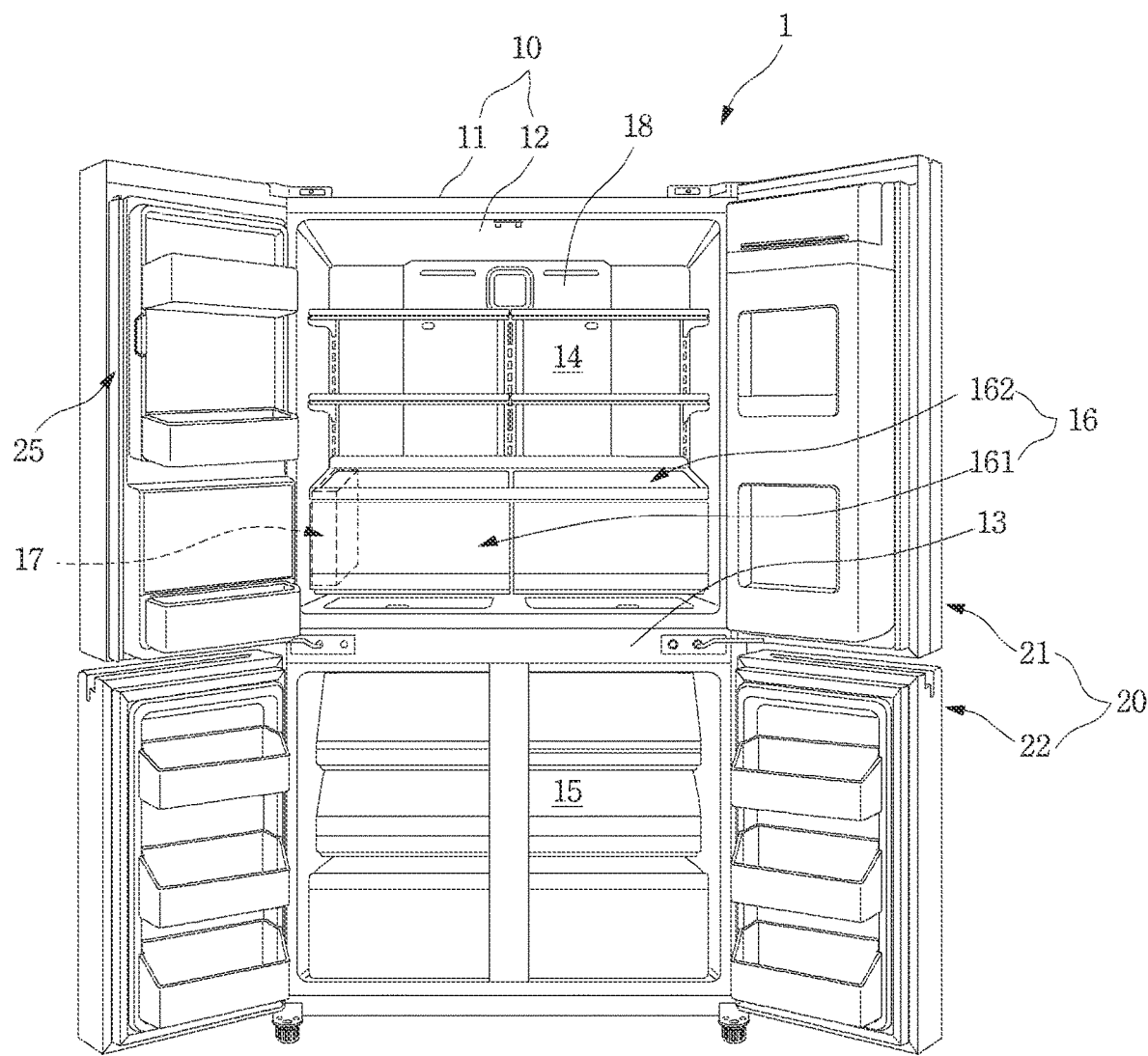
FIG. 2 is a front view illustrating a state in which a door of the refrigerator is opened.

Referring to FIGS. 1 and 2, a refrigerator 1 including a water purifying apparatus according to an embodiment may include a cabinet 10 defining a storage space and a door opening and closing the storage space of the cabinet 10. An outer appearance of the refrigerator 1 may be defined by the cabinet 10 and the door 20.

The cabinet 10 may include an outer case 11 defining an outer surface thereof and made of a metal material and an inner case 12 coupled to the outer case 11 to define the storage space in the refrigerator 1 and made of a resin material. Also, an insulating material 103 may be filled between the outer case 11 and the inner case 12 to insulate an inner space of the refrigerator 1 from the outside.

The storage space is divided vertically based on a barrier 13 and may be constituted by an upper refrigerating compartment 14 and a lower freezing compartment 15. Also, the freezing compartment 15 may be further divided horizontally. Alternatively, the storage space may be partitioned into left and right side with respect to the barrier 13.

The door 20 may include a refrigerating compartment door 21 and a freezing compartment door 22, which respectively independently open and close the refrigerating compartment 14 and the freezing compartment 15.

Both the refrigerating compartment door 21 and the freezing compartment door 22 may have a structure capable of opening and closing the refrigerating compartment 14 and the freezing compartment 15 by rotation. For this, all of the refrigerating compartment door 21 and the freezing compartment door 22 may be rotatably coupled to the cabinet 10 by a hinge device 23. In addition, the refrigerating compartment door 21 may be a French-type door in which a pair of doors disposed at both left and right sides independently rotates.

A dispenser 23 and an ice maker 24 may be provided in one of the pair of refrigerating compartment doors 21.

The dispenser 23 may be disposed on a front surface of the refrigerating compartment door 21, and a user may manipulates the dispenser 23 from the outside to dispense water or ice. In addition, an ice making chamber 25 is provided above the dispenser 23. The ice making chamber 25 is an insulating space in which ice is made and stored, and the ice maker 24 may be accommodated in the ice making chamber and be opened and closed by a separate door. Also, although not shown, the ice making chamber 25 may communicate with the freezing compartment 15 by a cooling air duct to receive cool air that is required for making ice cubes from a freezing compartment evaporator (not shown) in a state in which the refrigerating compartment door 21 is closed.

A plurality of shelves and drawers configured to store food may be provided in the refrigerating compartment 14. Particularly, a drawer assembly 16 including a drawer 161 provided so as to be able to be drawn in and out and a table 162 that shields a top surface of the drawer 161 may be provided on a bottom surface of the refrigerating compartment 14.

The drawer assembly 16 may be configured so that the inside thereof is visible, and a main water tank 34 provided at a rear side of the refrigerating compartment 14 is shielded by the drawer 161. In addition, a water purifying apparatus 17 may be provided at one side of the drawer assembly 16 to purify water to be supplied to the dispenser 23 and supply the purified water the ice maker 24. The water purifying apparatus 17 may be disposed between an accommodation space and a wall surface of the drawer 161 and be shielded by a front surface of the drawer 161. Thus, when the drawer 161 is closed, the water purifying apparatus 17 may not be exposed to the outside, and when the drawer 161 is drawn out, the water purifying apparatus 17 may be exposed to the outside so as to be accessible to the water purifying apparatus 17. Of course, the mounted position of the water purifying apparatus 17 is not limited to one side of the drawer 161. For example, the water purifying apparatus 17 may be provided in the refrigerating compartment 14 or a region of the refrigerating compartment 14 including the refrigerating compartment door 21.

A plurality of shelves, each of which has a cantilever structure, may be detachably provided above the drawer assembly 16 in a height-adjustable form. In addition, a main duct 18 may be provided on a rear surface of the refrigerating compartment 14, and cold air generated by an evaporator may be supplied into the refrigerating compartment 14 through a plurality of outlets provided in the main duct 18.

Figure 3:
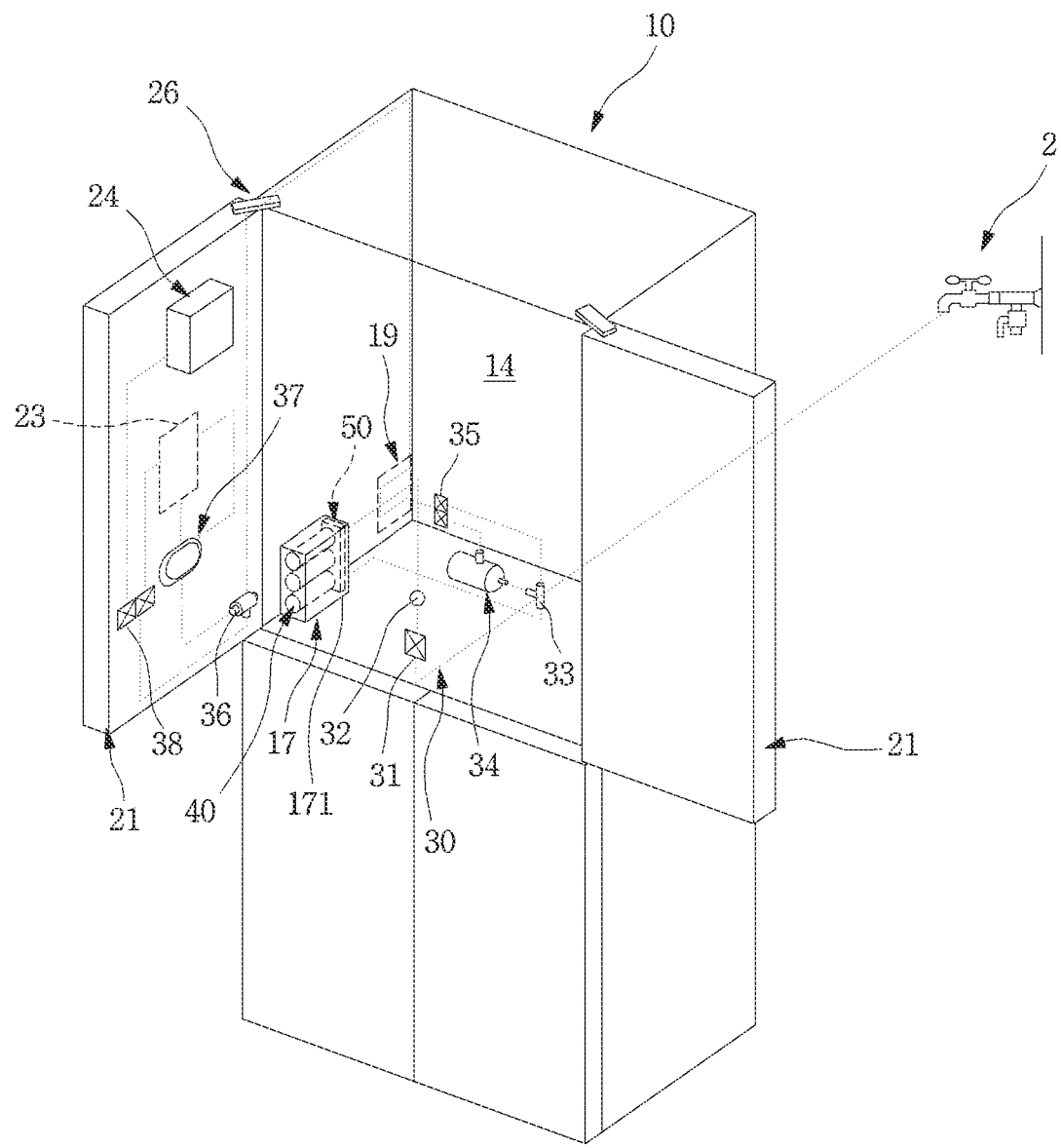
FIG. 3 is a schematic view illustrating an arranged structure of a water supply passage of the refrigerator.

FIG. 3 is a schematic view illustrating an arranged structure of a water supply passage of the refrigerator.

Referring to FIG. 3, the refrigerator 1 may include a water supply passage 30 through which water supplied from an external water source is dispensed to the dispenser 23 after being purified or cooled, or the purified water is supplied to the dispenser 23 or the ice maker 24.

The water supply passage 30 may be directly connected to the water supply source 2 such as a water tube outside of the refrigerator and be inserted into a space inside the refrigerator through a tube guide 19 mounted inside the cabinet 10 and then connected to an inlet inside the refrigerator.

In addition, the water supply passage 30 may include a water supply valve 31 and a flow sensor 32. If necessary, the flow sensor 32 may be integrated with the water supply valve 31.

The water supply passage 30 may connect the water purifying apparatus 17 to a first branch tube 33, and the water supply passage 30 branched from the first branch tube 33 may be connected to each of the main water tank 34 and the first branch valve 35.

The water supply passage 30 connected to an outlet of the first branch valve 35 may extend along a sidewall inside the cabinet 10 or a rear wall outside the cabinet through the tube guide 19 and then extend along a top surface. Then, the water supply passage 30 may be inserted into the refrigerating compartment door 21 via a door hinge 26.

Also, the water supply passage of the refrigerating compartment door 21 may be branched by a second branch tube 36 and connected to an inlet of a sub water tank 37 and a second branch valve 38. The sub water tank 37 is connected to the dispenser 23 so that cooled water is dispensed through the dispenser 23.

In addition, the outlet of the second branch valve 38 may be connected to the dispenser 23 and the ice maker 24 by the water supply passage 30 to supply purified water to the dispenser 23 and the ice maker 24.

As described above, the water purified through the water purifying apparatus 17 may be cooled and supplied to the dispenser 23 or may be supplied to the dispenser 23, or the purified water without being cooled may be supplied to the ice maker 24.

Also, the water purifying apparatus 17 may include a plurality of filters 40 configured to purify water supplied as a whole and a head unit 50 to which each of the plurality of filters 40 are coupled and which is connected to a passage through which water flows. In addition, the water purifying apparatus 17 may further include a case 171 in which the filters 40 and the head unit 50 are accommodated.

Figure 4:
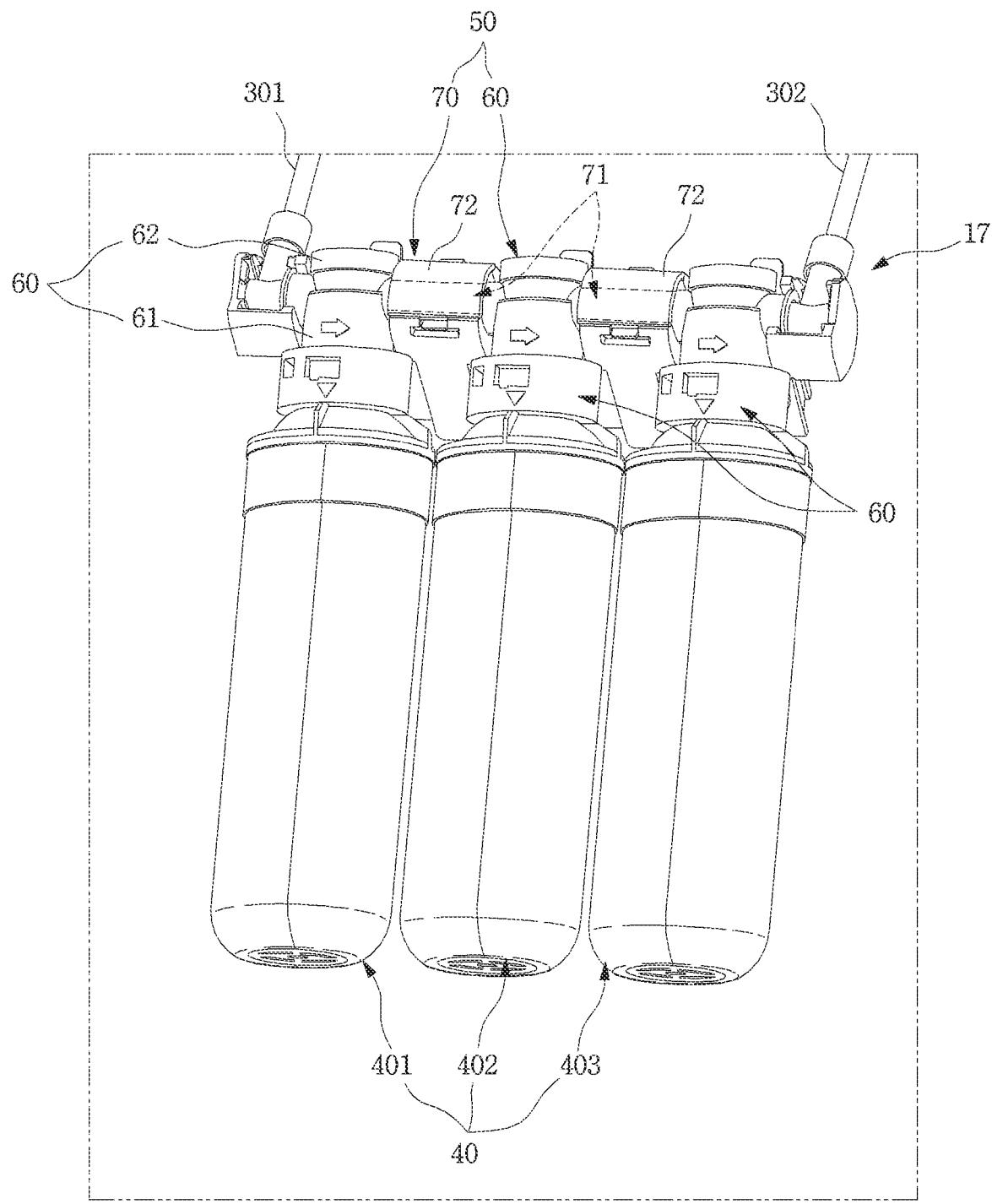
FIG. 4 is a perspective view illustrating a structure of the water purifying apparatus.

FIG. 4 is a perspective view illustrating a structure of the water purifying apparatus.

Referring to FIG. 4, the water purifying apparatus 17 may include the filter 40 and the head unit 50.

The number of filters 40 is not limited. For example, a single filter 40 may be provided, and a plurality of filters 40 may be provided.

For example, the filter 40 may include a first filter 401 connected to a water inlet-side of the head unit 50, a third filter connected to a water outlet-side of the head unit 50, a second filter 402 disposed between the first filter 401 and the third filter 403 to purify the water through a combination of the filters.

The first filter 401 may be a free carbon filter, the second filter 402 may be a membrane filter, and the third filter 403 may be a post carbon filter. Of course, in this specification, the number and type of filters 40 are not limited, but different types of functional filters may be applied for the number of filters 40, which are capable of being accommodated in the water purifying apparatus 17, and efficient water purification.

The head unit 50 may include a plurality of heads 60 to which the respective filters 40 are coupled, and a mounting member 70 on which the heads 60 are rotatably seated.

A water inlet tube 301 through which raw water is introduced may be connected to one end of the mounting member 70, and a water outlet tube 302 through which purified water is discharged may be connected to the other end of the mounting member 70.

In the state in which the plurality of heads 60 are mounted on the mounting member 70, the plurality of heads 60 may independently rotate. The plurality of heads 60 may be configured so that passages thereof are connected by a connection tube 71, and the raw water introduced through the water inlet tube 301 may be purified after passing through each filter and then be discharged to the water outlet tube 302.

In addition, the connection tube 71 may be mounted on the mounting member 70 and be provided between two adjacent heads 60 to enable a flow of water between the heads 60. In addition, a cover 72 may be mounted on one side of the mounting member 70 corresponding to the connection tube 71 to shield the connection tube 71.

The head 60 includes a head body 61, into which the upper end of the filter 40 is inserted and fixed, and a shaft 90 that defines a passage through which water flows by being connected to an upper end of the filter 40 inside the head body 61. The head 50 may further include a head cap 62 that shields a top surface of the head body 61 into which the shaft 90 is inserted.

The filter 40 may be fixedly mounted to the head 60 in a rotational manner, and in the process of mounting the filter 40, the shaft 90 may be connected to the filter 40 to define the passage, and when the filter 40 rotates, the shaft 90 may rotate together.

That is, in the state in which the filter 40 is mounted by the shaft 90, the passage may be converted toward the filter 40 so that the water is purified by passing through the filter 40. In addition, in the state in which the filter 40 is separated, the water supplied to the water inlet 611 may be blocked by the shaft 90 so as not to pass into the filter 40.

The case 171 may be provided in various structures capable of accommodating the filter 40 and the head unit 50. The case 171 may completely accommodate the filter 40 and the head unit 50. Alternatively, the case 171 may accommodate at least a portion of the filter 40 and the head unit 50.

In addition, the case 171 may have a structure capable of being fixedly mounted at one side of the inside of the refrigerating compartment 14. Alternatively, if necessary, the case 171 may not be provided, and the mounting member 70 may be directly mounted at one side of the inside of the refrigerating compartment 14.

Only one filter 40 may be provided according to a function of the water purifying apparatus 17, and when only one filter 40 is provided, the head unit 50 may be also constituted by one head 60 and one mounting member 70. The heads 60 may have the same structure regardless of the number of heads 60. Hereinafter, a water purifying apparatus including a singular filter 40 and a singular head 60 will be described, FIG. 5 is a perspective view illustrating a structure of the water purifying apparatus according to another embodiment.

Figure 6:
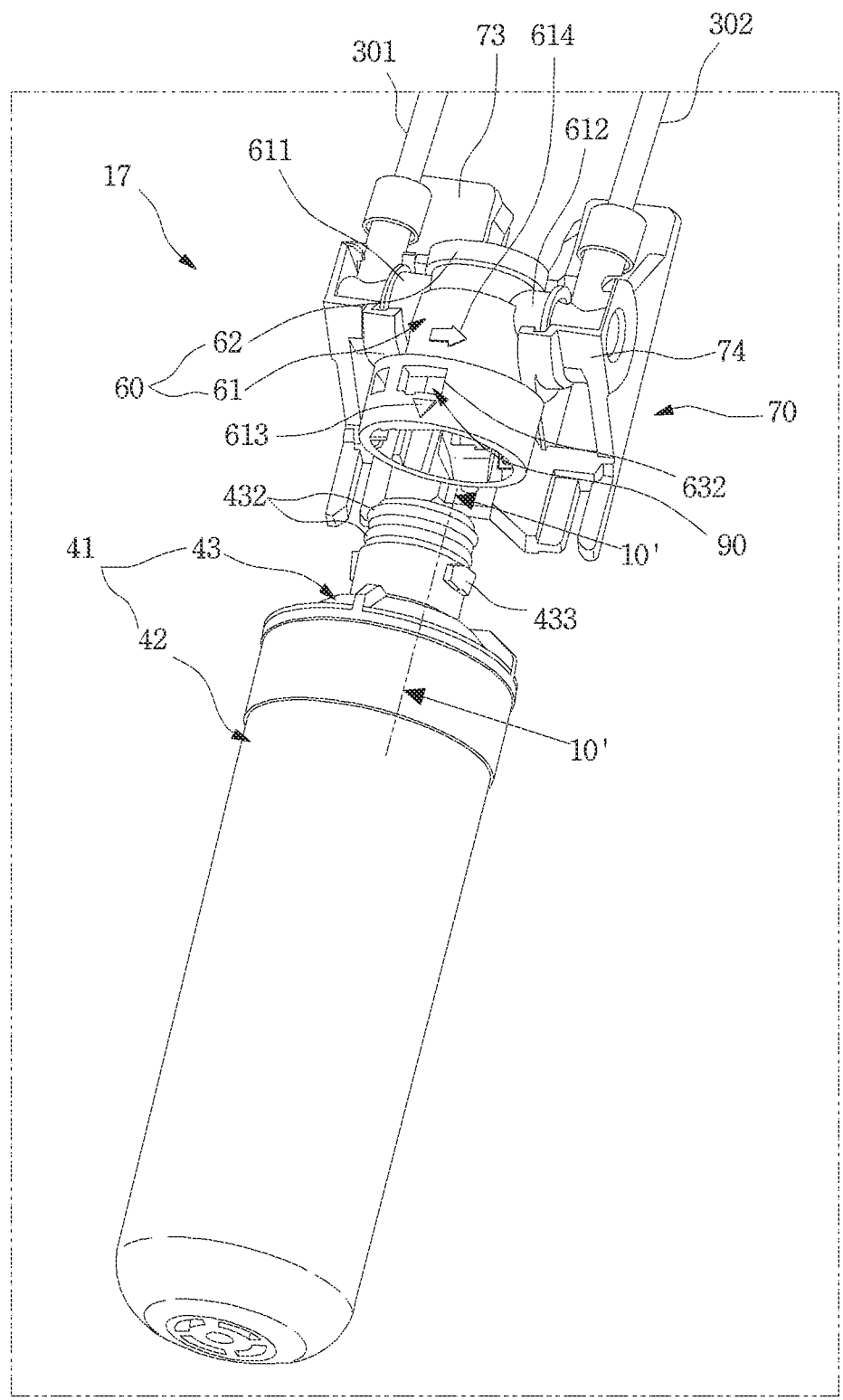
FIG. 6 is an exploded perspective view illustrating a state in which a filter and a head of the water purifying apparatus are separated from each other.

FIG. 6 is an exploded perspective view illustrating the state in which the filter and the head of the water purifying apparatus are separated from each other.

Figure 5:
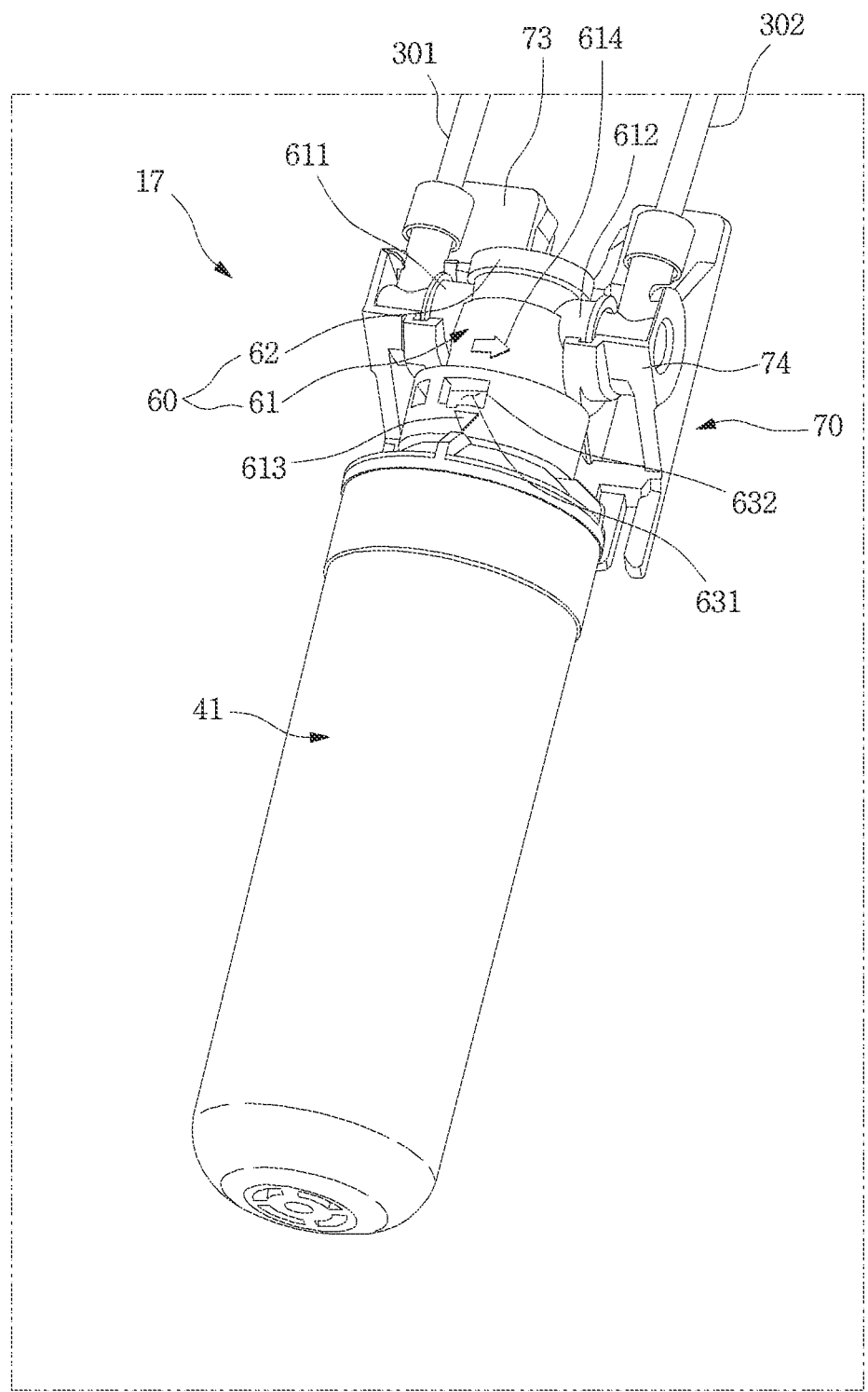
FIG. 5 is a perspective view illustrating a structure of the water purifying apparatus according to another embodiment.

Referring to FIGS. 5 and 6, a water purifying apparatus 17 according to another embodiment may include a filter 40 and a head 60. The water purifying apparatus 17 may further include a mounting member 70 on which the head 60 is mounted.

The filter 40 may have a cylindrical shape and be defined in outer appearance by a housing 41. The housing 41 may include a housing body 42 accommodating a filtering member 44 therein and a housing cap 43 coupled to an upper end of the housing body 42 to define an upper portion of the housing 41.

The housing body 42 may be manufactured in a cylindrical shape so that a first accommodation space for accommodating the filtering member 44 is defined. The housing body 42 may have an upper opening.

The housing cap 43 may be coupled to the upper opening of the housing body 42. The housing cap 43 may define a second accommodation space that accommodates a portion of the filtering member 44. For this, a portion of the housing cap 42 may have a cylindrical shape. Also, the housing cap 43 has an upper opening. A portion of a shaft 90 to be described later may be inserted through an upper opening of the housing cap 43.

The housing cap 43 may be inserted into an opened bottom surface of the head 60. In addition, a pair of O-rings 432 may be provided on an upper end of the housing cap 43, and the O-rings 432 may be sealed together with an inner surface of the head 60 to prevent water from leaking.

In addition, a coupling protrusion 433 may be further provided on an outer circumferential surface of an upper portion of the housing cap 43. The coupling protrusion 433 may move along a coupling groove 631 defined in the inner surface of the head 60 when the upper portion of the filter 40 is inserted into the head 60.

Here, the coupling protrusion 433 and the coupling groove 631 may be provided in a direction crossing the insertion direction of the filter 40. Therefore, the filter 40 may rotate in the state of being inserted into the head 60, and the coupling protrusion 433 and the coupling groove 631 may be coupled to each other by the rotation of the filter 40. In addition, in a state in which the filter 40 and the head 60 are completely coupled to each other, passages of the filter 40 and the head 60 may be connected to each other so that the supplied water is introduced into the filter 40.

The mounting member 70 may include a base mounted on a wall surface of one side of the case 171 or the refrigerator and a rotation support portion 74 protruding from both sides of the base 73 to rotatably support both sides of the head 60.

Ends of the water inlet tube 301 and the water outlet tube 302 may be disposed on the rotation support portion 74, and the water inlet tube 301 and the water outlet tube 302 in the rotation support portion 74 may be connected to a water inlet 611 and a water outlet 612 of the head 60, respectively.

The head 60 may be rotatably mounted on the mounting member 70 by the rotation support portion 74. Thus, when the filter 40 is detached, the head 60 may rotate or be tilted to secure a space for the detachment of the filter 40, thereby more easily detach the filter 40.

The head 60 may have a cylindrical shape with an open bottom surface and may include a head body into which the filter 40 is inserted to be fixed, a shaft 90 accommodated inside the head body 61. In addition, the head 60 may further include a head cap 62 that shields an opened top surface of the head body 61.

An insertion indicator 613 indicating an insertion position of the coupling protrusion 433 may be disposed on an outer surface of the head body 61. The insertion indicator 613 may be provided by printing, molding or processing, and the user may recognize the position of the coupling groove 631 by the insertion indicator 613. As a result, the coupling groove 631 may be easily aligned with the coupling protrusion 433.

Also, a rotation indicator 614 indicating a rotation direction of the filter 40 may be disposed on an outer surface of the head body 61. The rotation indicator 614 may also be provided by printing, molding or processing, and the user manipulate the filter 40 to rotate in a correct direction by the rotation indicator 614, and thus, the coupling protrusion 433 may move along the inside of the coupling groove 631 so as to be coupled to the coupling groove 631.

Figure 7:
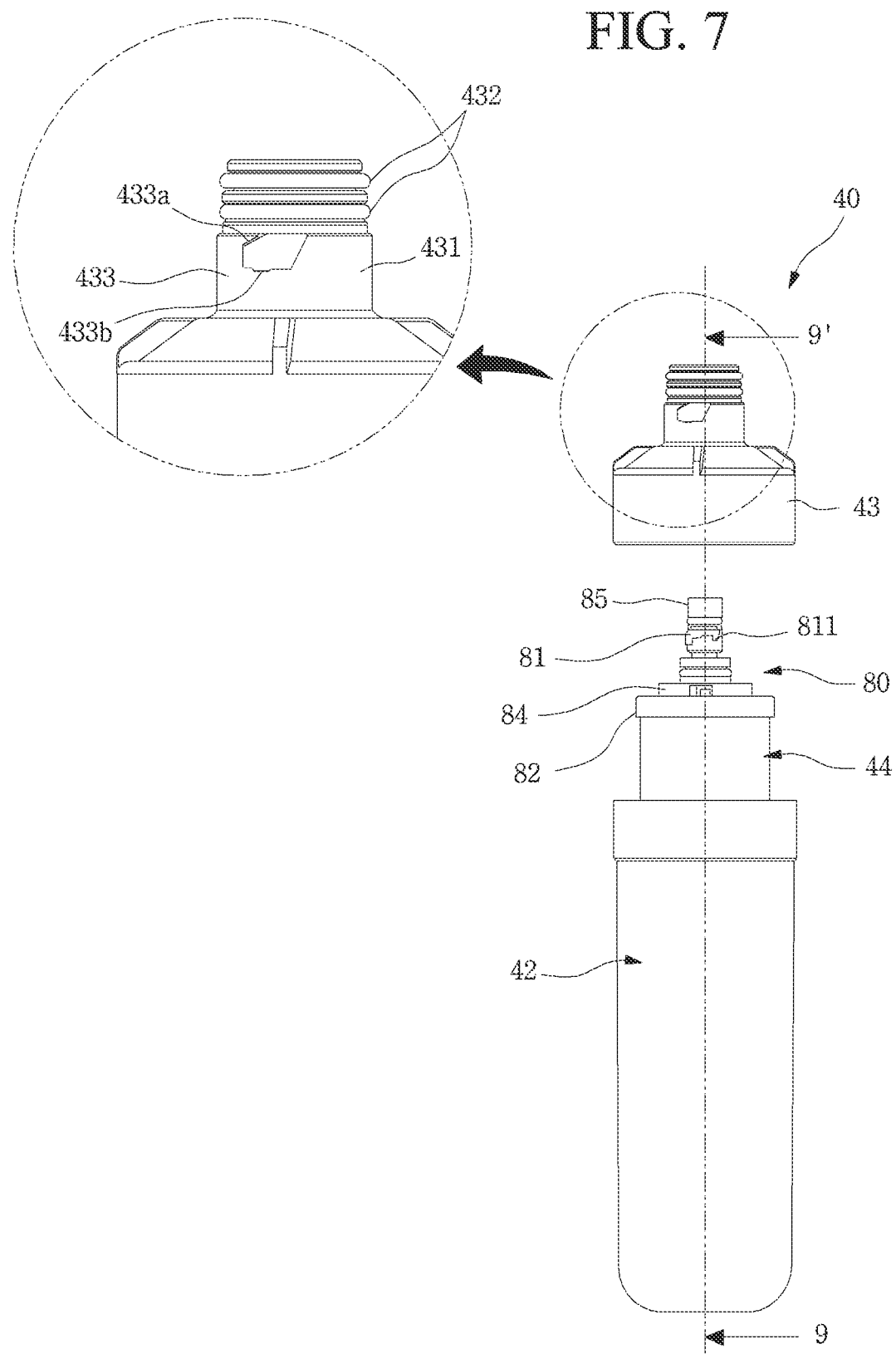
FIG. 7 is an exploded view illustrating a structure of the filter.
Figure 8:
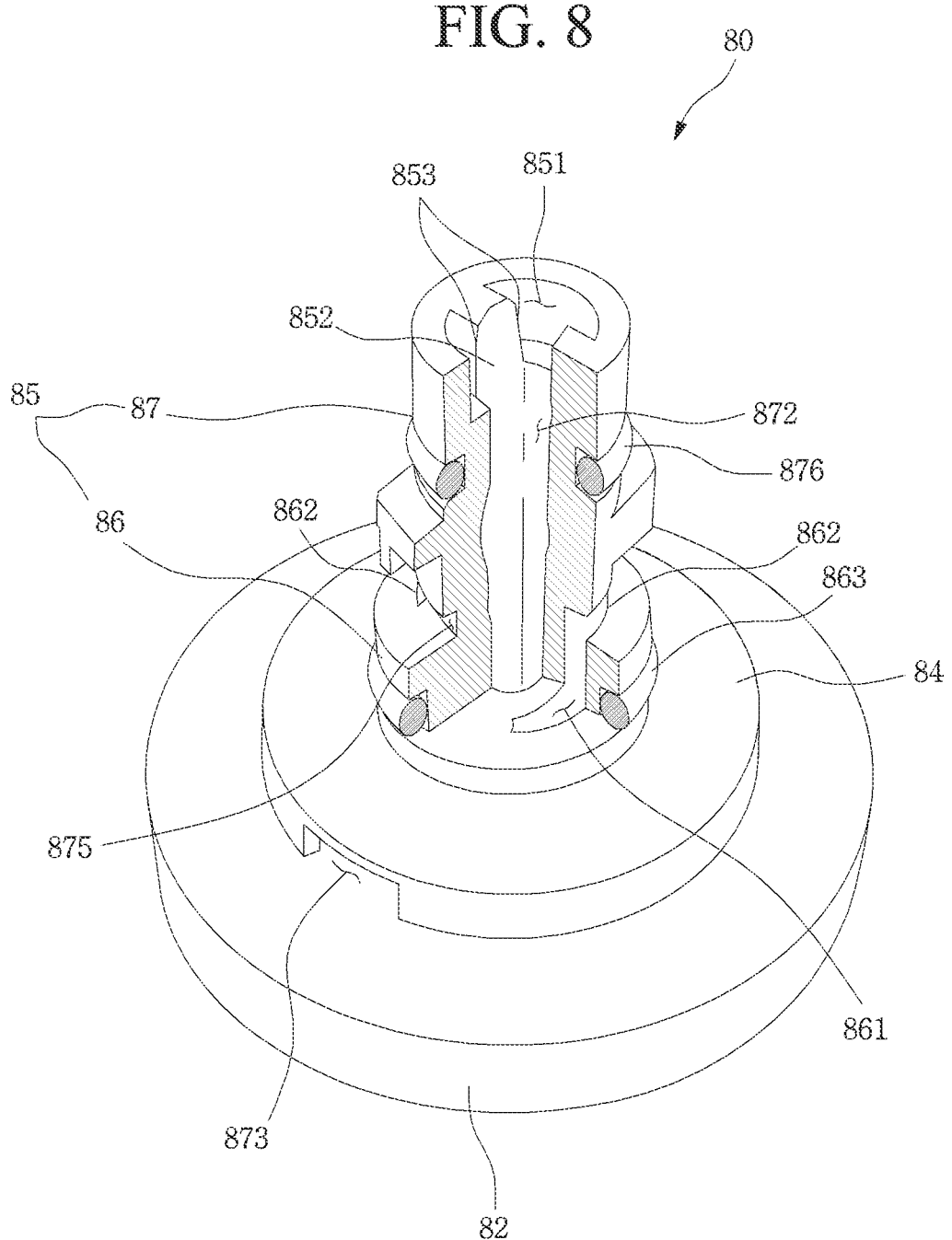
FIG. 8 is a partial cutaway perspective view illustrating an upper supporter of the filter.

An opening 632 through which a hooked state of the coupling protrusion 433 is confirmed may be further defined in the outer surface of the head body 61. The opening 632 may be defined at a position corresponding to the position of the coupling groove 631 or may include at least a portion of the coupling groove 631. FIG. 7 is an exploded view illustrating a structure of the filter. FIG. 8 is a partial cutaway perspective view illustrating an upper supporter of the filter.

Looking at the structure of the filter 40 in more detail with reference to the drawings, the filter 40 may include a filter housing 41 defining an outer appearance thereof, a filtering member 44 provided in the filter housing 41, and an upper supporter 80 that supports the filtering member 44.

The filter housing 41 may have a cylindrical shape, and the housing body 42 and the housing cap 43 may be coupled to each other. In addition, a filter insertion portion 431 may be provided in an upper end of the housing cap 43, and a plurality of O-rings 432 may be vertically and continuously disposed in the filter insertion portion 431.

In addition, the coupling protrusion 433 may be disposed below the O-ring 432 at the outside of the filter insertion portion 431. A pair of the coupling protrusions 433 may be disposed at positions opposite to each other, and each of the coupling protrusions 433 may have a size that is sufficient to be inserted into the coupling groove 631.

A protrusion guide portion 433a may be disposed on each of the coupling protrusions 433. The protrusion guide portion 433a may be disposed on a top surface of the coupling protrusion 433 to have an inclination or a predetermined curvature. In addition, the coupling protrusion 433 may be in contact with the groove guide portion 633 that guides the coupling protrusion 433 to an inlet of the coupling groove 631 to guide rotational movement of the coupling protrusion 433 in one direction.

A coupling protrusion 433b protruding downward may be further disposed at one side of a bottom surface of the coupling protrusion 433, and the coupling protrusion 433b may be hooked to restricted at the inside of the coupling groove 631. Thus, the filter 40 may be fixed to the inside of the head 60 in a state in which the coupling protrusion 433 is completely inserted into the coupling groove 631.

The upper supporter 80 may be accommodated in a second accommodation space defined by the housing cap 43, The upper supporter 80 may be coupled to each of a top surface of the filtering member 44 and an inner surface of the housing cap 43.

In addition, a supporter coupling portion 81 may be disposed on the upper supporter 80. For example, the supporter coupling portion 81 may be formed in the second extension portion 87. A hook portion 811 may be disposed on one end of the supporter coupling portion 81.

In a state in which the upper supporter 80 completely rotates in the state in which the upper end of the upper supporter 80 is inserted into the filter insertion portion 431, the hook portion 811 of the supporter coupling portion 81 may be hooked and restricted at an end of the housing coupling portion so that the upper supporter 80 is coupled to the housing cap 43.

Also, if the filter 40 rotates when the filter 40 is mounted, the upper supporter 80 may also rotate.

The filtering member 44 may be accommodated in the filter housing 41. The filtering member 44 may allow the introduced water to be purified while pass therethrough. For example, the filtering member 44 may be a commonly used carbon filter or membrane filter, and in addition, various types of filters may be used according to required purification performance.

The filtering member 44 may have a cylindrical shape in which a hollow 441 is defined in a vertical direction at a center thereof, and an upper supporter 80 and a lower supporter may be respectively coupled to upper and lower ends of the filtering member 44 so that the filtering member 44 is fixedly mounted inside the filter housing 41.

In addition, an outer diameter of the filtering member 44 may be less than an inner diameter of the filter housing 41, and a space through which water flows may be defined between the filter housing 41 and the outer surface of the filtering member 44.

The upper supporter 80 may be provided on the upper end of the filtering member 44 and extend upward to define a passage connecting an inlet of the filter insertion portion 431 to the hollow 441. Thus, water supplied from the head 60 through the filter insertion portion 431 may be introduced into the filtering member 44, and the water purified by the filtering member 44 may be discharged to the head 60.

The upper supporter 80 may include a supporter accommodation portion 82 that accommodates the upper end of the filtering member 44.

The upper supporter 80 may further include a supporter insertion portion 83 extending downward from a center of the supporter accommodation portion 82 and inserted into a hollow 441 of the filtering member 44.

The upper supporter 80 may further include a supporter stepped portion 84 protruding to be stepped upward from a top surface of the supporter insertion portion 83.

The upper supporter 80 may further include a supporter extension portion 85 extending from a center of a top surface of the supporter stepped portion 84 toward the inside of the filter insertion portion 431.

When the upper supporter 80 and the filtering member 44 are coupled, the supporter accommodation portion 82 may surround a top surface and a circumference of the filtering member 44. In addition, the supporter insertion portion 83 may be inserted into the hollow 441 so that the upper supporter 80 is fixedly mounted on the top surface of the filtering member 44 that is in contact with the inner surface of the filtering member 44.

The supporter insertion portion 83 may be provided to have a hollow therein and may communicate with a filter output passage 861 provided in the supporter extension portion 85. Therefore, the purified water flowing into the hollow 441 of the filtering member 44 may sequentially pass through the supporter insertion portion 83, the filter output passage 861, and a filter outlet 862 disposed at an end of the filter output passage 861 and then may be discharged through an opening of the filter insertion portion 431.

The supporter stepped portion 84 may protrude from the top surface of the supporter accommodation portion 82 and may have a diameter less than that of the supporter accommodation portion 82. In addition, when the housing cap 43 and the upper supporter 80 are coupled to each other, the supporter accommodation portion 84 and a circumference of the supporter stepped portion 84 may be spaced apart from an inner surface of the housing cap 43.

The supporter extension portion 85 may extend upward from a center of the supporter stepped portion 84. The supporter extension portion 85 may be disposed inside the filter insertion portion 431 when the housing cap 43 and the upper supporter 80 are coupled to each other. In addition, the filter input passage 871 and the filter output passage 861 may be disposed inside the supporter extension portion 85. Thus, supplying of water into the filter 40 and discharging of purified water from the filter 40 may be performed through the supporter extension portion 85.

In detail, a first filter input passage 872 extending downward may be provided in an opened top surface of the supporter extension portion 85. In addition, a second filter input passage 873 passing across the supporter stepped portion 84 may be provided in the supporter stepped portion 84.

The second filter input passage 873 may have an opening defined in a circumferential surface of the supporter stepped portion 84 and may extend toward a center of the supporter stepped portion 84. The first filter input passage 872 and the second filter input passage 873 may be connected to each other at a lower end of the supporter extension portion 85, that is, inside the supporter stepped portion 84.

Thus, after the water introduced through the filter insertion portion 431 is introduced through the first filter input passage 872 of the supporter extension portion 85 to move to the outside along the second filter input passage 873 branched from the lower end of the first filter input passage 872 to both sides and then be discharged through the opening of the circumference of the supporter stepped portion 84.

The water discharged through the filter input passage 871 may flow along a space between the filter housing 41 and the filtering member 44. In addition, the water introduced to the outside of the filtering member 44 may be purified while passing through the filtering member 44 so as to be introduced into the hollow 441.

The supporter extension portion 85 may include a first extension portion 86 extending from the top surface of the supporter stepped portion 84 and a second extension portion 87 extending upward from the first extension portion 86. The first extension portion 86 may have an outer diameter greater than that of the second extension portion 87, and a filter outlet 862 may be provided above the first extension portion 86.

In this case, the filter output passage 861 may be defined in a space between the inner surface of the first extension 86 and the outer surface of the second extension 87. In addition, the first filter input passage 872 may extend from the opened top surface to the lower end of the second extension portion 87.

An outer diameter of the first extension portion 86 may be slightly less than an inner diameter of the filter insertion portion 431, and the purified water discharged through the filter outlet 862 may be discharged through a space between the first extension portion 86 and the filter insertion portion 431.

In addition, an outlet groove 875 may be defined in the filter outlet 862. The outlet groove 875 may be defined by being recessed along a circumference of the second extension portion 87. Thus, the water discharged from the filter outlet 862 disposed at each of both sides may flow along the outlet groove 875 and then be discharged along a water outlet guide portion 965*b* provided on the outer surface of the shaft 90.

An outer diameter of the second extension portion 87 may correspond to an inner diameter of the shaft 90 disposed inside the filter insertion portion 431. Thus, when the second extension portion 87 and the shaft 90 are coupled to communicate with each other, water supplied through the inside of the shaft 90 may be introduced into the second extension portion 87.

A first extension portion O-ring 863 may be provided outside the first extension portion 86, and a second extension portion O-ring 876 may be provided outside the second extension portion 87.

Thus, the water for purification, which is introduced into the supporter extension portion 85, and the purified water discharged to the outside of the supporter extension portion 85 may flow through an independent passage without leaking or mixed with each other.

A first connection portion 851 may be disposed on an upper end of the supporter extension portion 85. The first connection portion 851 may be provided to be recessed inward from the upper end of the supporter extension portion 85 and may be symmetrical to both left and right sides. The first connection portion 851 may be provided in a corresponding shape so that when the second connection portion 972 of the shaft 90 to be described below is inserted, the first connection portion 851 may be engaged with and coupled to the second connection portion 972. In addition, in the state in which the first connection portion 851 and the second connection portion 972 are coupled to each other, the shaft 90 and the filter 40 may rotate together.

The first connection portion 851 may be recessed to a predetermined depth and may be disposed to be symmetrical with respect to the protrusion 852 protruding from an opposite position of the inner surface of the supporter extension portion 85. In addition, a first inclined surface 853 may be disposed on each of both ends of the first connection portion 851, that is, on each of both sides of the protrusion 852. The first inclined surface 853 may have a shape in which a width of the first connection portion 851 becomes wider, and a width of the protrusion 852 becomes narrower from a lower side toward an upper side, That is, the first connection portion 851 may be provided so that the width of the first connection portion 851 becomes narrower in a recessed depth direction.

Due to such a structure, the first connection portion 851 and the second connection portion 972 may be easily fitted with each other. In addition, when torsional moment is applied in a state in which the first connection portion 851 and the second connection portion 972 are in contact with each other, the first connection portion 851 and the second connection portion 972 may be slid, and thus, the filter 40 may be easily separated from the shaft 90.

Figure 9:
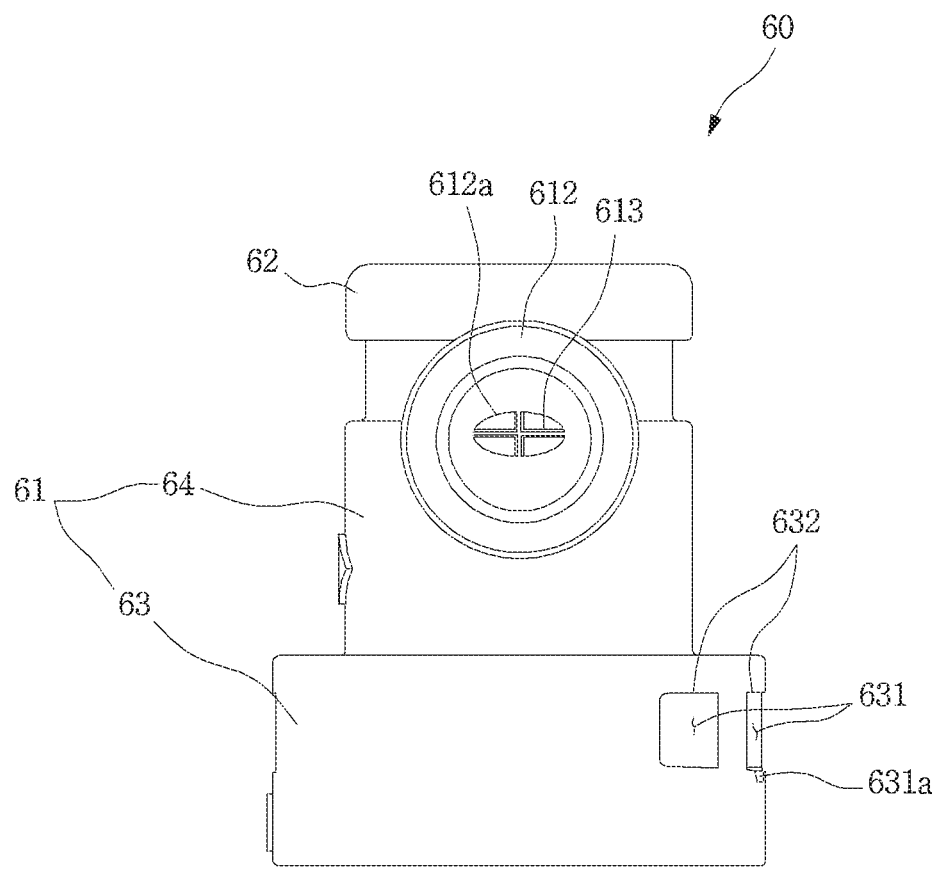
FIG. 9 is a side view of the head.
Figure 10:
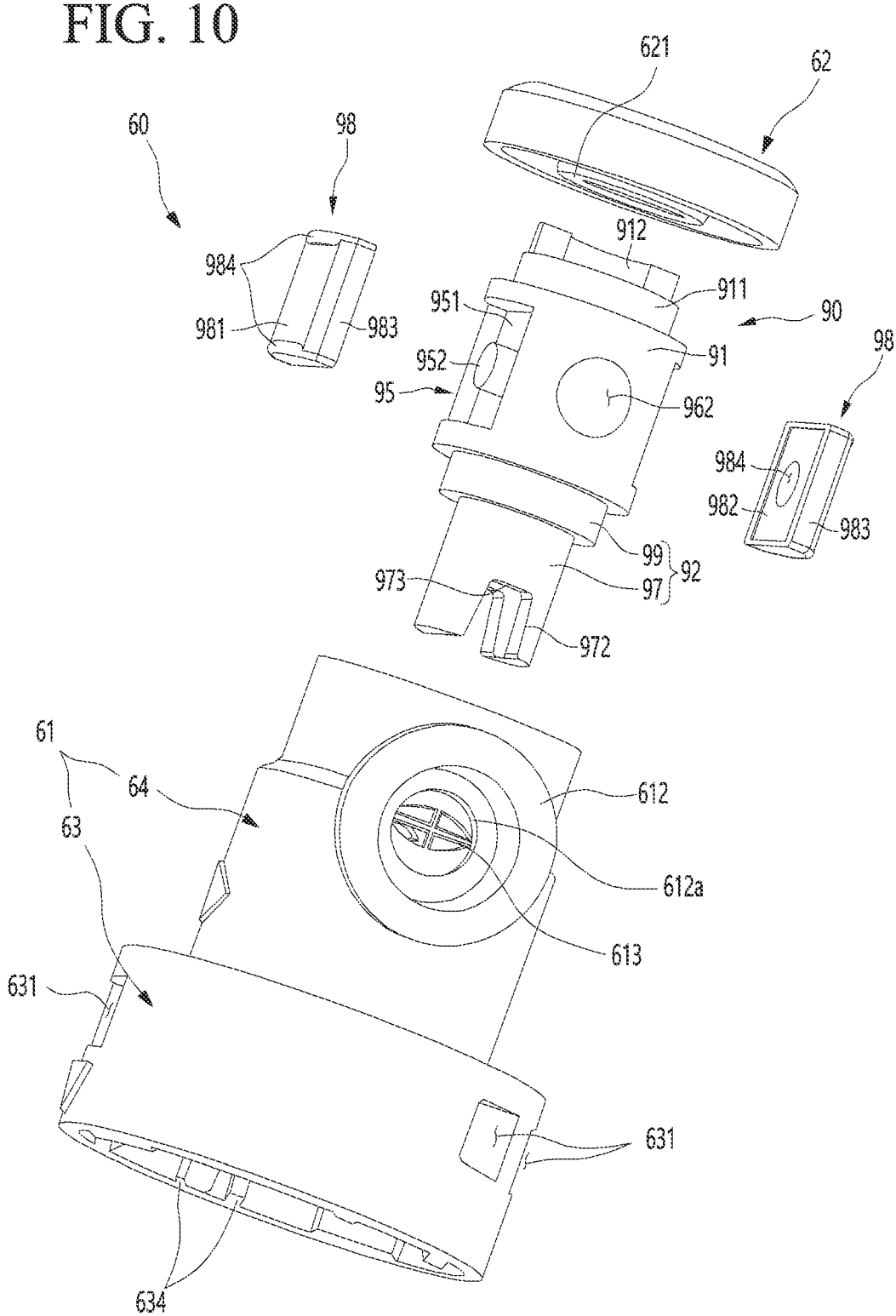
FIG. 10 is an exploded perspective view illustrating a coupling structure of the head when viewed from one side.

FIG. 9 is a side view of the head. FIG. 10 is an exploded perspective view illustrating a coupling structure of the head when viewed from one side.

In the head 60, the shaft 90 may be inserted through the opened top surface of the head body 61, and the head cap 62 may shield the opened top surface of the head body 61.

The head body 61 may include a lower body 63 and an upper body 64.

The lower body 63 may be a portion into which the filter insertion portion 431 is inserted and coupled, and a bottom surface of the lower body 63 may be opened to accommodate the filter 40. In addition, the coupling groove 631 into which the coupling protrusion 433 is inserted may be defined in the lower body 63.

An opening 632 for defining the coupling groove 631 may be defined in the lower body 63, and the inserted state of the coupling protrusion 433 may be confirmed through the opening 632. A plurality of supporting ribs 634 that support the outside of the filter insertion portion 431 to prevent the filter 40 from sagging in the state in which the filter insertion portion 431 is inserted may be disposed on a circumference of an inner surface of the lower body 63.

The upper body 64 may be disposed on the upper end of the lower body 63 and may have a diameter less than that of the lower body 63. The shaft 90 may be mounted inside the upper body 64, and the shaft 90 may be inserted through an opened top surface of the upper body 64 and be mounted inside the upper body 64.

In addition, all the upper end of the filter insertion portion 431, the upper end of the supporter extension portion 85, and the lower end of the shaft 90 may be disposed inside the upper body 64, and thus, a passage through which the water purified while passing through the filter 40 flows may be provided by the coupling of the configurations.

In the upper body 64, the water inlet 611 and the water outlet 612 may be disposed to protrude to the outside. In addition, the water inlet 611 and the water outlet 612 may communicate with the water inlet tube 301 and the water outlet tube 302, respectively. Here, the water inlet 611 and the water outlet 612 may selectively communicate with the passage provided in the shaft 90. The water inlet 611 and the water outlet 612 may be arranged in a straight line to face each other in the head.

The head cap 62 may shield the top surface of the upper body 64. The head cap 62 may press a top surface of the shaft 90 so that the shaft 90 is fixedly mounted on the inside of the upper body 64. For this, a cap support portion 621 extending to the top surface of the shaft 90 may be further disposed on a bottom surface of the head cap 62.

The shaft 90 may be rotatably seated on the upper body 64. A body seating portion 65 may be disposed on an inner circumferential surface of the upper body 64. When the shaft 90 is mounted inside the head 60, a bottom surface of the stepped portion 99 of the shaft 90 to be described later may be mounted on the body seating portion 65.

An inner body 615 that is in contact with at least a portion of the shaft 90 may be disposed inside the head 60. The inner body 615 may extend downward from the body seating portion 65.

In addition, the inner body 615 may be disposed to be spaced inward from the upper body 64, that is, in a direction closer to the shaft 90. In addition, the inner body 615 may be disposed to be spaced a set distance from the inner pipe 97. The inner body 615 may extend further downward than the inner pipe 97 so that a lower end of the inner pipe 97 is disposed further below a lower end of the inner pipe 97.

The inner body 615 may more firmly support the shaft 90 from the inside. In addition, in the process of mounting or removing the filter 40, a movement range of the filter 40 is limited, thereby preventing the shaft 90 and the head 60 from being damaged or deformed.

The shaft 90 may have a filtering passage 96 provided therein to guide a passage of water introduced into the water inlet 611 to the inside of the filter 40. In addition, the shaft 90 may selectively connect the passage of the water introduced inside the head 60 by rotation to the inside of the filter 40 or block the flow inside the head 60.

Hereinafter, the structure of the shaft 90 will be described in detail.

Figure 11:
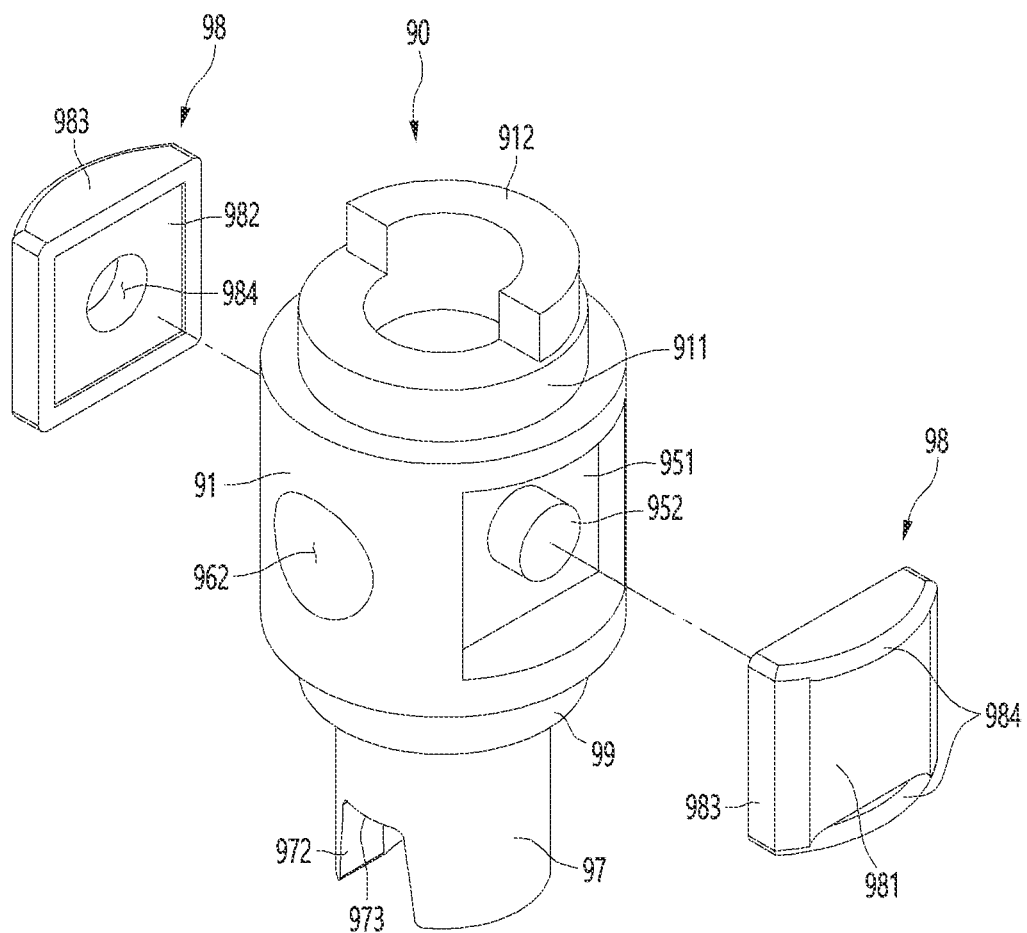
FIG. 11 is an exploded perspective view illustrating a structure of a shaft.
Figure 12:
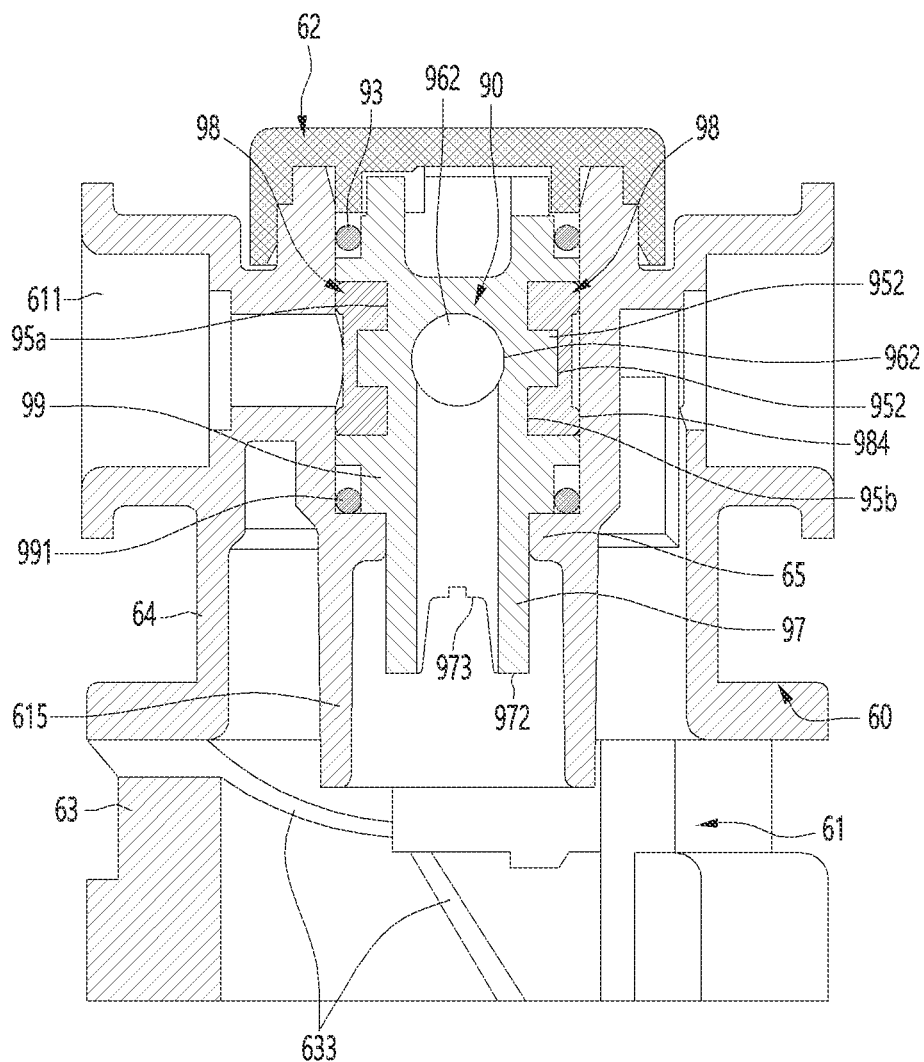
FIG. 12 is a cross-sectional view illustrating structures of the head and the shaft when the filter is mounted on the head.
Figure 13:
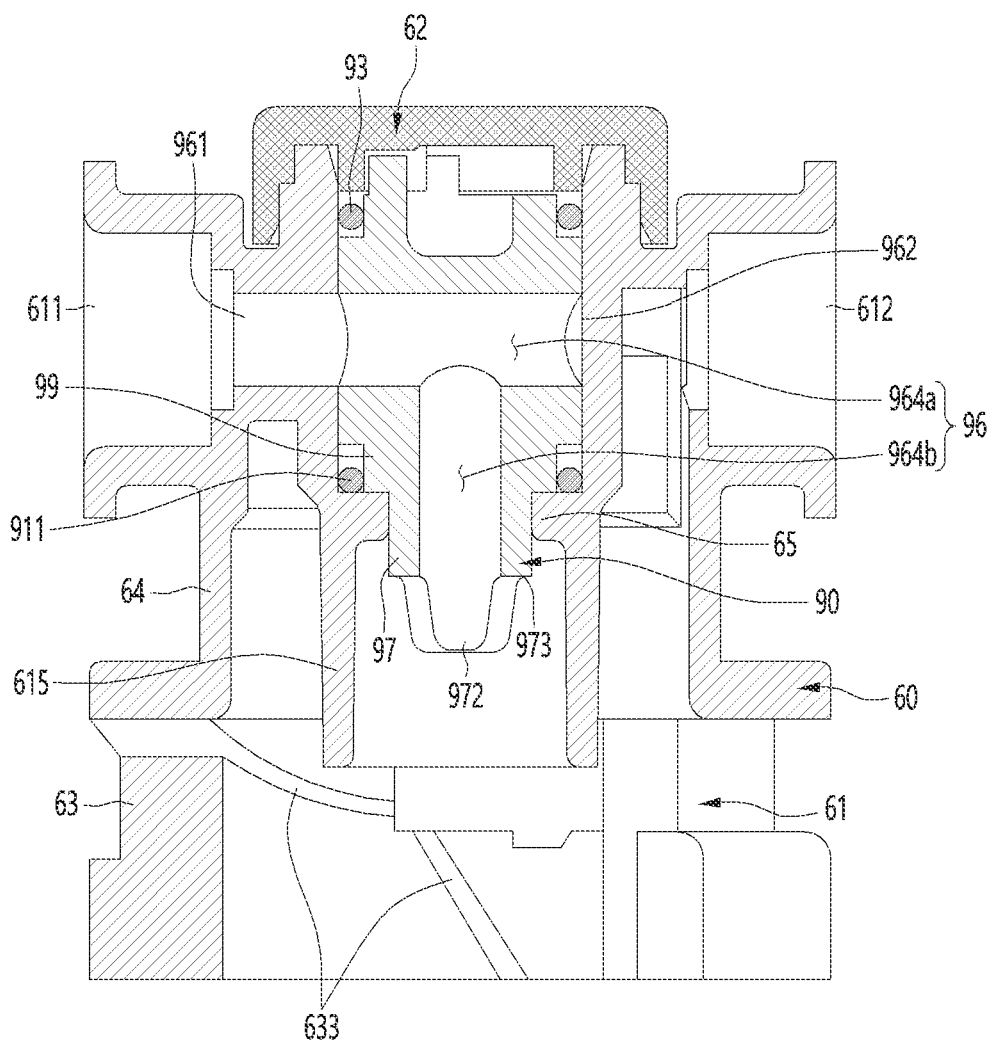
FIG. 13 is a cross-sectional view illustrating structures of the head and the shaft when the filter is separated from the head.

FIG. 11 is an exploded perspective view illustrating a structure of the shaft. FIG. 12 is a cross-sectional view illustrating structures of the head and the shaft when the filter is mounted on the head. FIG. 13 is a cross-sectional view illustrating structures of the head and the shaft when the filter is separated from the head.

The shaft 90 may include an upper part 91 and a lower part 92. In addition, the upper part 91 may have a diameter greater than that of the lower part 92 and also may have an outer diameter corresponding to an inner diameter of the upper body 64.

In addition, a coupling part for coupling with the head cap 62 may be further provided on an upper portion of the upper part 91. The coupling part may include a first coupling part 911 extending upward from an upper end of the upper part 91 and a second coupling part 912 extending upward from an upper end of the first coupling part 911.

An outer diameter of the first coupling part 911 may be less than an outer diameter of the upper part 91. In addition, an outer diameter of the second coupling part 912 may be less than an outer diameter of the first coupling part 911.

At least a portion of the second coupling part 912 may be cut. In addition, the coupling part may be fixed by being partially inserted into the cap support part 621. Due to the coupling part, the shaft 90 may be fixed to the head cap 62.

A shaft inlet 961 and a shaft outlet 962, which communicate with the water inlet 611 and the water outlet 612 and guide the water to the inside of the filter 40, may be disposed around the upper part 91. In addition, a water inlet blocking portion 95a that block the introduction of the water through the water inlet 611 may be disposed on a circumference of the upper part 91. In addition, a water outlet blocking portion 95b that block the discharging of the water outlet 612 may be disposed on a circumference of the upper part 91.

According to the rotation of the shaft 90, the shaft inlet 961 may be disposed at a position corresponding to the water inlet 611, or the water inlet blocking portion 95a may be disposed at a position corresponding to the water inlet 611. In addition, the shaft outlet 962 may be disposed at a position corresponding to the water outlet 612, or the water outlet blocking portion 95b may be disposed at a position corresponding to the water outlet 612.

When the shaft inlet 961 is disposed at the position corresponding to the water inlet 611, the water in the water inlet 611 may be introduced into the shaft 90 and also may be introduced into the filter 40 according to the guidance of the filtering passage 96 provided in the shaft 90.

In addition, when the water inlet blocking portion 95a is disposed at the position corresponding to the water inlet 611, the water of the water inlet 611 may not be introduced into the shaft 90, and also, the discharging of the water to the water outlet 612 may be blocked.

Referring to FIG. 11, each of the shaft inlet 961 and the shaft outlet 962 are disposed on the circumference of the upper part 91. The shaft inlet 961 and the shaft outlet 962 may be formed at positions facing each other. In addition, the shaft inlet 961 and the shaft outlet 962 may be disposed at positions corresponding to the water inlet 611 and the water outlet 612, respectively. In addition, the shaft inlet 961 and the shaft outlet 962 may be opened to pass through the circumferential surface of the upper part 91.

Thus, as the shaft 90 rotates, the water inlet 611 and the shaft inlet 961 may communicate with each other, and the water outlet 612 and the shaft outlet 962 may communicate with each other.

Here, the water passing through the water inlet 611 may be introduced into the shaft inlet 961, and the water passing through the shaft outlet 962 may be discharged through the water outlet 612.

In addition, each of the shaft inlet 961 and the shaft outlet 962 may be provided in a circular shape. A diameter of each of the shaft inlet 961 and the shaft outlet 962 may correspond to or greater than that of each of the water inlet 611 and the water outlet 612. As each of the shaft inlet 961 and the shaft outlet 962 are provided in the circular shape, an area of the passage may be maximized to increase in flow rate of water introduced into and discharged from the head.

In addition, head O-rings 94 may be provided between the water inlet 611 and the shaft inlet 961 and between the water outlet 612 and the shaft outlet 962, respectively. The head O-ring 94 may seal a gap between the inner surfaces of the upper part 91 and the inlet 611 and the water outlet 612 to prevent water from being introduced into or discharged from the head 60.

The shaft inlet 961 and the shaft outlet 962 may be referred to as a shaft entrance.

A shaft O-ring 93 may be provided at each of an upper end and a lower end of the upper part 91. The shaft O-ring 93 may seal a gap between the shaft 90 and the inner surface of the upper body 64 to prevent water from leaking through the head 60.

The water inlet blocking portion 95a and the water outlet blocking portion 95b may be disposed on the circumference of the upper part 91. The water inlet blocking portion 95a may be disposed between the shaft inlet 961 and the shaft outlet 962. The water outlet blocking portion 95b may also be disposed between the shaft inlet 961 and the shaft outlet 962. The water inlet blocking portion 95a and the water outlet blocking portion 95b may be disposed at positions facing each other. In addition, each of the water inlet blocking portion 95a and the water outlet blocking portion 95b may be recessed inward from the circumferential surface of the upper part 91.

Thus, the water inlet blocking portion 95a and the water outlet blocking portion 95b may block the water introduced into the water inlet 611 or block the water discharged from the water outlet 612 according to the positions at which the water inlet blocking portion 95a and the water outlet blocking portion 95b are disposed on the circumference of the upper part 91.

The water inlet blocking portion 95a and the water outlet blocking portion 95b may have the same shape and may be referred to as a blocking portion 95.

The blocking portion 95 may have an area larger than the total area of the shaft inlet 961 and the shaft outlet 962.

The blocking portion 95 may include a recess portion 951 that is recessed inward from the circumferential surface of the upper part 91, that is, in a direction closer to a central axis of the shaft 90.

The recess portion 951 may be provided in a rectangular shape. The recess portion 951 may be disposed to be spaced by a set distance between the shaft inlet 961 and the shaft outlet 962. Each of edges of the recess portion 951 may be provided in a rounded shape. An upper end of the recess portion 951 may be disposed higher than the upper end of the shaft inlet 961 or the shaft outlet 962. In addition, a lower end of the recess portion 951 may be disposed further lower than the lower end of the shaft inlet 961 or the shaft outlet 962.

The blocking portion 95 includes a protrusion 952 protruding outward from the recess portion 951, that is, in a direction away from the central axis of the shaft 90. The protrusion 952 may protrude with a predetermined area from a center of the recess portion 951. In addition, the protrusion 952 may be provided in a cylindrical shape, but is not limited thereto.

The protrusion 952 may be provided in a shape corresponding to the coupling groove 984 defined in the sealing pad 98 to be described below. In the protrusion 952, the sealing pad 98 may be mounted to the blocking portion 95.

The protrusion 952 may have a length protruding outward from the recess portion 951 to correspond to a depth at which the recess portion 951 is recessed inward or have a length less than the depth of the recess portion 951. That is, an end of the protrusion 952 may be disposed on the same plane as the outermost circumferential surface of the upper part 91 or may be disposed inside the outermost circumferential surface of the upper part 91.

In addition, a sealing pad 98 that shields the blocking portion 95 may be provided on the shaft 90. The sealing pad 98 may be mounted on the circumferential surface of the upper part 91 while being coupled to the blocking portion 95.

In detail, the sealing pad 98 may have a size corresponding to that of the blocking portion 95. That is, the sealing pad 98 may be provided in a shape corresponding to the recess portion 951 and may be inserted into the recess portion 951.

The sealing pad 98 may include an inner surface 982 that faces the recess portion 951 and is in contact with the recess portion 951, an outer surface 981 that faces the water inlet 611 or the water outlet 612 and defines a portion of the outer circumferential surface of the shaft 90, and a circumferential surface 983 that connects the inner surface 982 to the outer surface 981.

The inner surface 982 may be provided as a flat surface as a whole. In addition, a coupling groove 984 into which the protrusion 952 is inserted may be defined in the inner surface 982. The coupling groove 984 may be recessed from the inner surface of the sealing pad 98 to have a shape corresponding to the protrusion 952. In addition, the inner surface of the sealing pad 98 may be provided in a shape with rounded edges.

The outer surface 981 may define a portion of an outer circumferential surface of the shaft. And, the outer surface 981 may be provided at a position facing the water inlet 611 or the water outlet 612 by the rotation of the shaft 90. The outer surface 981 may be provided as a curved surface that protrudes outward toward a center of the outer surface 981 as a whole. Due to this curved surface, the shaft 90 may rotate smoothly without interference from the sealing pad 98.

The circumferential surface 983 may have a thickness so that the sealing pad 98 does not interfere when the shaft 90 rotates. Although not limited, the circumferential surface 983 may have a thickness corresponding to a depth at which the recess portion 951 is recessed in the upper part 91.

A sealing portion 984 may be disposed on a circumference of the sealing pad 98. In detail, the sealing portion 984 may protrude toward the water inlet 611 or the water outlet 612 along the circumference of the outer surface 981. The sealing portion 984 may be disposed along the circumferential surface 983 of the sealing pad 98.

The sealing portion 984 may be provided in a convexly rounded shape to the outside and may be in contact with an outer portion of the water inlet 611 or the water outlet 612. The sealing portion 984 may protrude by a set distance from an outer circumferential surface of the shaft 90. Thus, a predetermined distance may be defined between the inner surface of the head 60 and the circumferential surface of the shaft 90, and the shaft 90 may smoothly rotate inside the head 60 by the sealing portion 984.

In addition, when the blocking portion 95 is disposed to correspond to the water inlet 611 and the water outlet 612 by the rotation of the shaft 90, the sealing portion 984 may prevent the water introduced into the water inlet 611 from leaking between the inner surface of the head 60 and the outer surface of the shaft 90.

The lower part 92 is provided below the upper part 91. The lower part 92 includes a stepped portion 99 that is stepped downward from the upper part 91. In addition, the lower part 92 includes an inner pipe 97 that extends downward from the upper part 91 and is connected to one end of the filter.

In detail, an outer diameter of the stepped portion 99 may be less than an outer diameter of the upper part 91. Also, an outer diameter of the inner pipe 97 may be less than an outer diameter of the stepped portion 99.

A bottom surface of the stepped portion 99 may be seated on a body seating portion 65 disposed inside the head 60. In addition, a stepped portion O-ring 991 may be provided between the outer surface of the stepped portion 99 and the inner surface of the head 60. The stepped portion O-ring 991 may prevent water from leaking into the outer surface of the shaft 90 and the inside of the head 60. Specifically, the stepped portion O-ring 991 may prevent water flowing inside the head from leaking between the inner surface of the head 60 and the outer side of the shaft 90 and being introduced into the filter 40.

A length in which the stepped portion 99 extends from a bottom surface of the upper part 91 may be sufficient to define a space in which the stepped portion O-ring 991 is accommodated. The stepped portion 99 may be disposed to be spaced by a set distance between the bottom surface of the upper part 91 and the stepped portion O-ring 991. In this case, the shaft 90 may rotate more smoothly.

In addition, the stepped portion 99 may define a vertical portion 964b of the filtering passage 95.

In a state in which the stepped portion 99 is seated on the body seating portion 65, the stepped portion O-ring 991 may be provided on the outside. Due to this structure, a separate structure for fixing the stepped portion O-ring 991 is not required. Thus, when the shaft 90 is injection-molded, a parting line may be prevented from occurring.

An inner pipe 97 may be disposed on a lower end of the shaft 90. The inner pipe 97 may be provided to extend downward from the bottom surface of the stepped portion 99. The inner pipe 97 may be connected to the supporter extension portion 85. Thus, the water introduced through the shaft 90 may be supplied into the filter 40 through the upper supporter 80. The inner pipe 97 may define a vertical portion 964b of the filtering passage 96.

A second connection portion 972 to which the first connection portion 851 disposed on the upper end of the supporter extension portion 85 is coupled may be disposed on a lower end of the inner pipe 97. A pair of second connection portions 972 may be provided in the same shape at positions facing each other.

The second connection portion 972 may also rotate with the shaft 90 by the rotation of the filter 40 in a state in which the second connection portion 972 and the first connection portion 851 are coupled to each other.

A pair of pipe cutoff portions 973 may be provided between the pair of second connection portions 972. When the shaft 90 and the supporter extension portion 85 are completely fitted with each other, the pipe cutoff portion 973 may be fitted with the protrusion 852.

Figure 14:
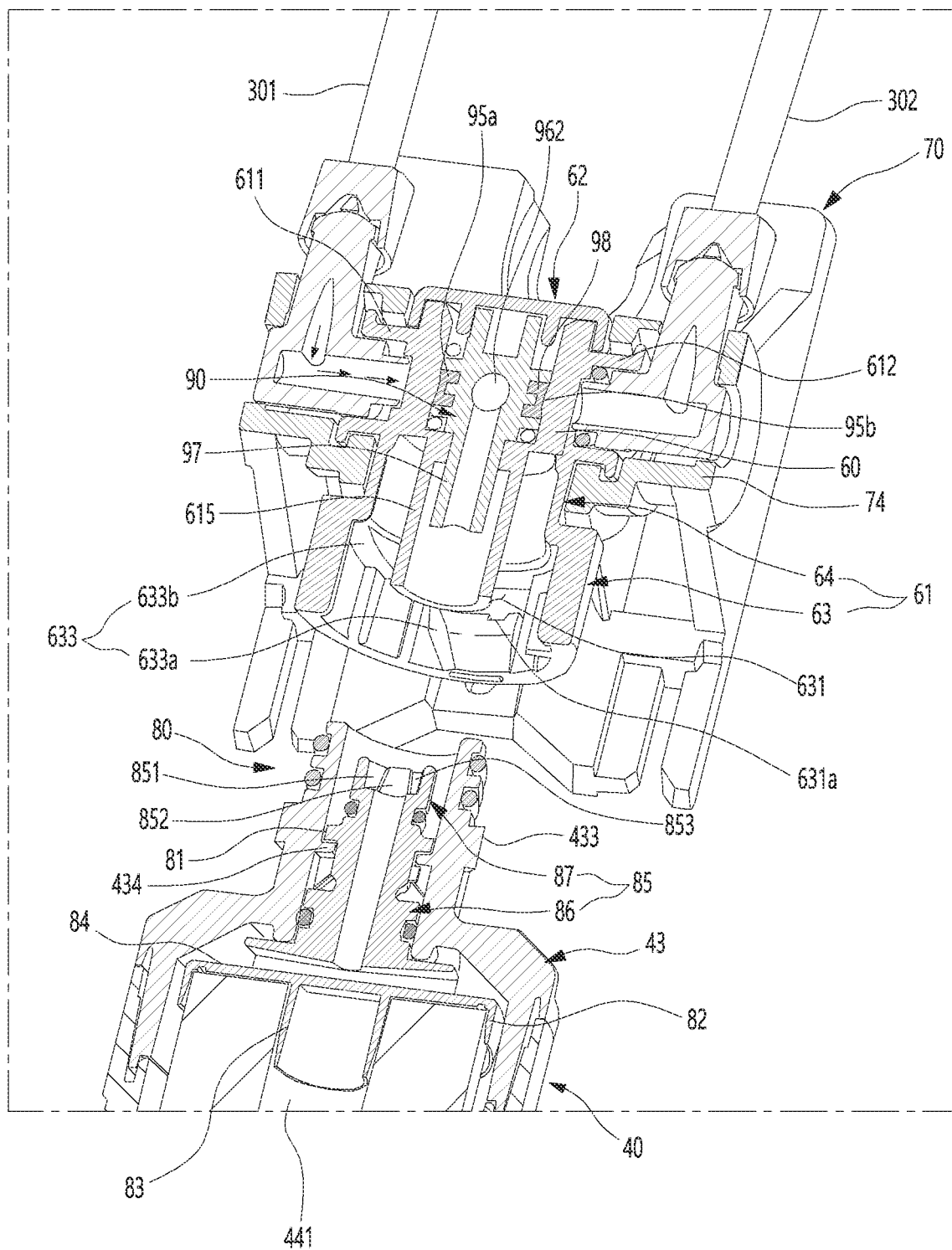
FIG. 14 is a view illustrating a passage in the state in which the filter is separated from the head.
Figure 15:
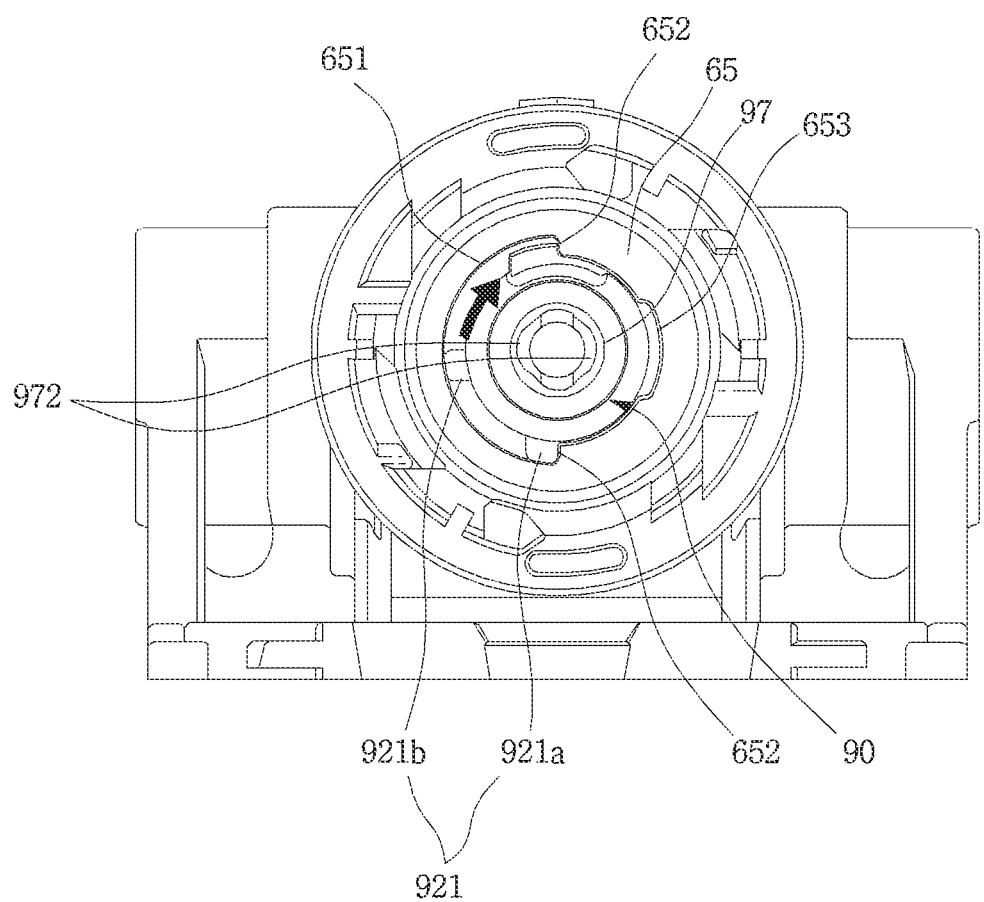
FIG. 15 is a view illustrating a position of the shaft in the state in which the filter and the head are separated from each other.

FIG. 14 is a view illustrating a passage in the state in which the filter is separated from the head. FIG. 15 is a view illustrating a position of the shaft in the state in which the filter and the head are separated from each other.

As illustrated in the drawings, in a state in which the filter 40 is not coupled to the head 60, the water introduced into the water inlet 611 may be blocked by the blocking portion 95.

Such a state may correspond to a state in which the filter 40 is separated for replacement of the filter 40 or a case for cleaning or service related to maintenance. In addition, the user may be in a state in which the filter 40 is separated to move the water purifying apparatus to a moving place. Since the water is not discharged to the water outlet 612 in the state in which the filter 40 is separated, the user may receive the water only when the filter 40 is mounted on the head 60.

When the shaft 90 rotates in the process of rotating to separate the filter from the head, the water inlet 611 and the water outlet 612 may be aligned at positions corresponding to the water inlet blocking portion 95a and the water outlet blocking portion 95b, respectively.

In addition, the water introduced into the water inlet 611 may be blocked by the water inlet blocking portion 95a and thus may not be introduced into the shaft 90. Thus, the water may not flow into the shaft 90, and thus, the water may not be discharged to the water outlet 612.

Thus, when the filter 40 is separated from the head 60, the water may not be discharged. The user may recognize that the filter 40 is not mounted on the head 60 as the water is not discharged. In addition, when the shaft 90 rotates while the user mounts the filter 40 on the head 60, the inlet 611 and the water outlet 612 may be connected to the filtering passage 96 so that the purified water is discharged via the filter 40.

In addition, the sealing pad 98 may prevent the water of the water inlet 611 from being introduced into or leaking into the shaft 90. Particularly, the sealing portion 984 disposed on the sealing pad 98 may be disposed on an outer circumferential surface of the water inlet portion 611 or the water outlet 612. In addition, the sealing portion 984 may be disposed to protrude toward the water inlet 611 or the water outlet 612. Thus, even if the water is introduced into the water inlet 611 due to the non-mounting of the filter 40, the introduced water may be prevented from leaking to the inside of each of the outer surface of the shaft 90 and the head 60.

Looking at the arrangement of the shaft 90 in a state in which the filter 40 is not mounted, the first rotating protrusion 921a among the pair of rotating protrusions 921 may be in contact with a stopper 652 disposed at one side of a rotation guide 651. In addition, in such a state, the water outlet guide portion 965b and the passage cutoff portion 653 may be maintained in a displaced state at an angle of approximately 90 degrees.

Figure 16:
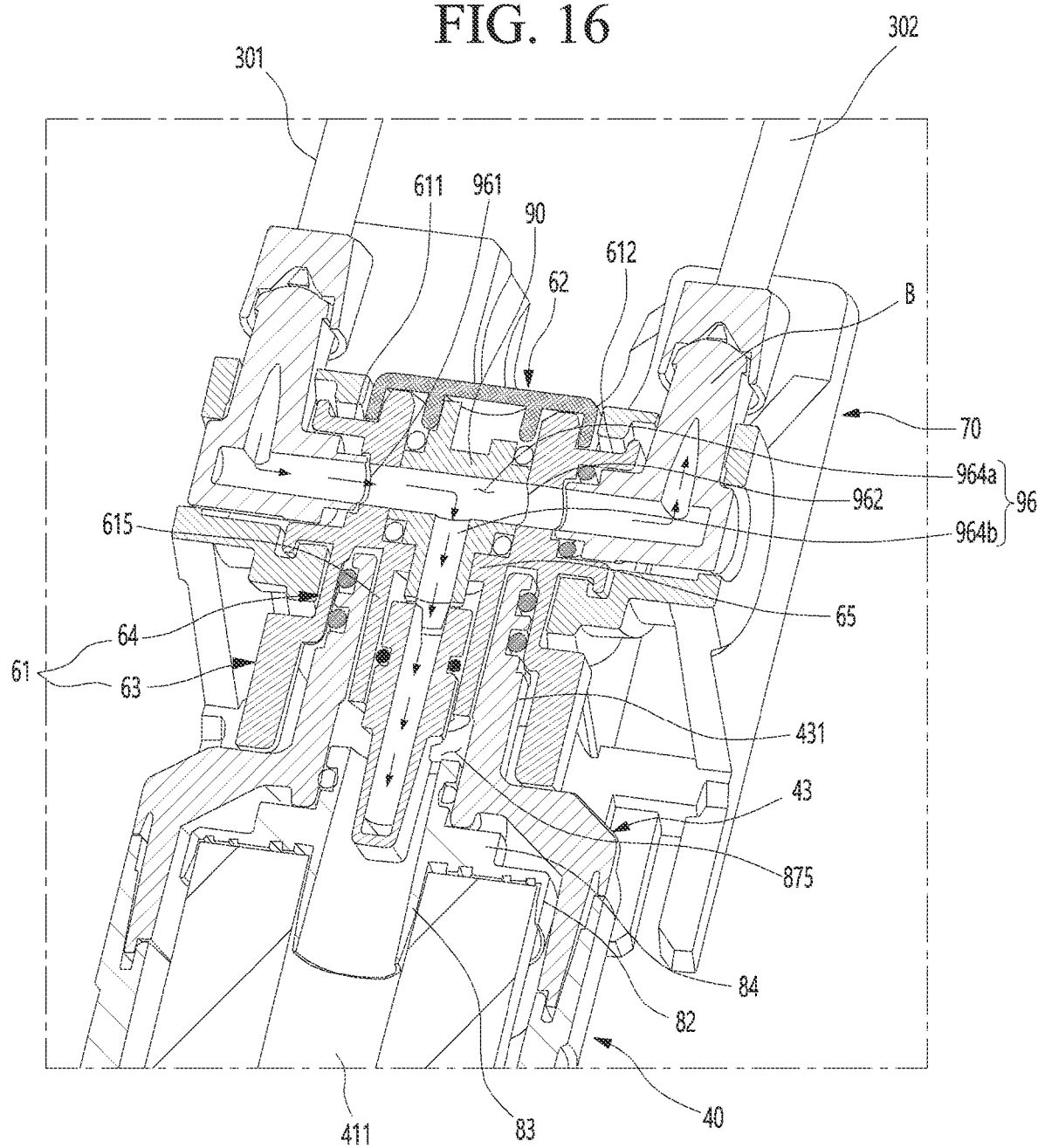
FIG. 16 is a view illustrating a passage in the state in which the filter is mounted on the head.
Figure 17:
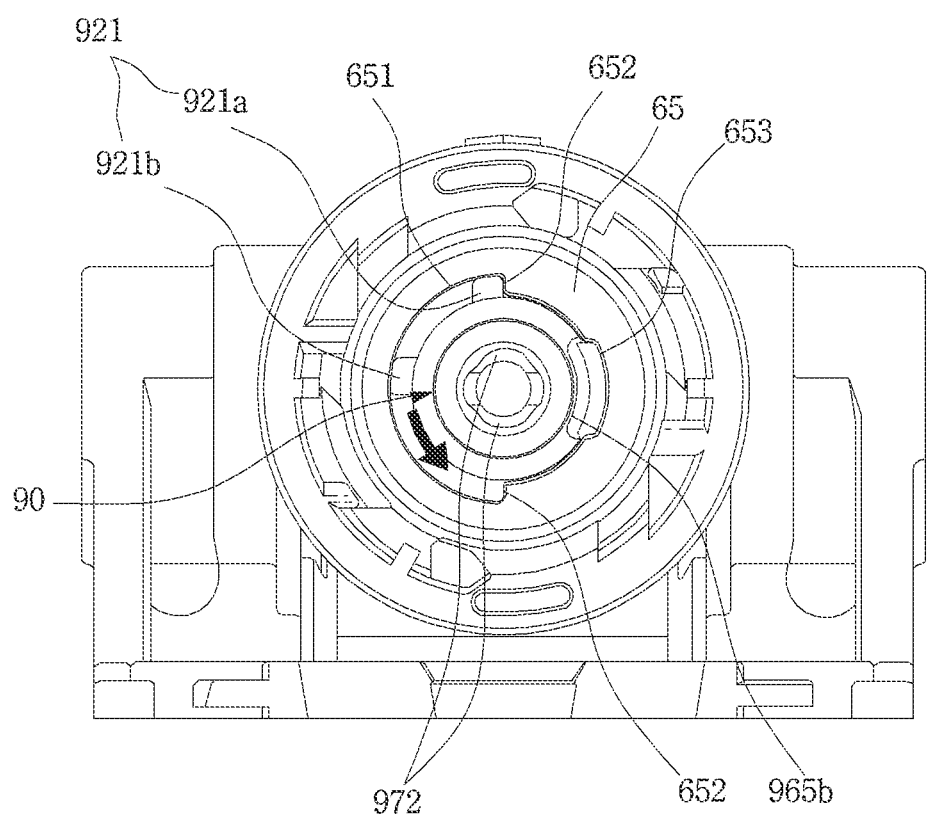
FIG. 17 is a view illustrating a position of the shaft in the state in which the filter and the head are coupled to each other.

FIG. 16 is a view illustrating a passage in the state in which the filter is mounted on the head. FIG. 17 is a view illustrating a position of the shaft in the state in which the filter and the head are coupled to each other.

When the filter 40 further rotates at an angle of 90 degrees to rotate so that the coupling protrusion 433 and the coupling groove 631 are completely coupled to each other, the shaft 90 may also rotate together and be in a state as illustrated in FIG. 17.

In detail, when the filter 40 rotates in the state in which the second connection portion 972 is inserted into the first connection portion 851 so as to be completely coupled to each other, the shaft 90 may rotate together with the filter 40.

The shaft 90 may further rotate by approximately 90 degrees until the second rotating protrusion 921b reaches a position of the stopper 652. When the shaft 90 completely rotate, the filtering passage 96 may be in a state in which the water inlet 611 and the water outlet 612 are connected to each other. Of course, the inner pipe 97 and the supporter extension portion 85 may be maintained in a state of being connected to each other so that raw water and purified water are introduced and discharged between the head 60 and the filter 40. In addition, in the state in which the coupling protrusion 433 is completely inserted into the coupling groove 631 so as to be coupled to each other, the user may manipulate the filter 40 to rotate in an opposite direction to the coupling direction, thereby maintaining the coupled state until the filter 40 is separated from the head 60.

The filtering passage 96 may be provided in the shaft 90. The filtering passage 96 may be selectively connected to the water inlet 611 and the water outlet 612 by the rotation of the shaft 90.

In detail, an upper end of the filtering passage 96 may be disposed inside the upper part 91. In addition, when the shaft 90 rotates in the process of mounting the filter 40, the shaft inlet 961 and the shaft outlet 962 may be aligned at positions correspond to the water inlet 611 and the water outlet 612, respectively. The water supplied to the water inlet 611 may pass through the filtering passage 96 to pass through the filter 40, and then, the purified water may be discharged to the water outlet 612.

The filtering passage 96 may include a shaft water inlet passage 964 and a shaft water outlet passage 965.

The shaft water inlet passage 964 may include a horizontal portion 964a extending from the shaft inlet 961 to a center of the shaft 90 and a vertical portion 964b extending downward from an end of the vertical portion 964a. The vertical portion 964b may be provided by the inner pipe 97.

The inner pipe 97 and the supporter extension portion 85 may be coupled to each other so that the shaft water inlet passage 964 communicates with the filter input passage 871, and water to be purified may be supplied to the filtering member 44.

The shaft water outlet passage 965 may include a water outlet guide portion 965b disposed on the outer surface of the lower part 92 and a water outlet connection portion 965a disposed on the upper part 91.

An upper end of the water outlet guide portion 965b may pass through the bottom surface of the upper part 91 to communicate with the water outlet connection portion 965a. In addition, the water outlet connection portion 965a may connect the water outlet guide portion 965b to the shaft outlet 962 inside the upper part 91.

Thus, the purified water discharged from the filter outlet 862 may move upward along the water outlet guide portion 965b and then may be discharged to the shaft outlet 962 through the water outlet connection portion 965a. The purified water discharged to the shaft outlet 962 may be discharged through the water outlet 612.

In addition, the water outlet tube 302 of the water outlet 612 may define a portion of the water supply passage 30 to supply the purified water to a dispenser 23 and an ice maker 24.

Due to this structure, only when the filter 40 is mounted on the head 60, the water inlet 611 and the water outlet 612 may be connected to the filtering passage 96 to supply the water passing through the filter to the user. In addition, in the state in which the filter 40 is not mounted on the head 60, the water supplied from the water inlet 611 may be blocked by the blocking portion 95 so that the water is not discharged to the water outlet 612. That is, the water may be discharged to the water outlet 612 only when the filter 40 is mounted on the head 60. Therefore, it is possible to prevent the user from using raw water that does not pass through the filter 40 by mistakenly thinking that the filter 40 is mounted even though the filter 40 is not mounted.

The water purifying apparatus the refrigerator including the water purifying apparatus according to the proposed embodiment may have the following effects.

In the embodiment, when the filter is separated from the filtering passage may be head by the rotation operation, the blocked by the rotation of the shaft. Thus, in the state in which the filter is not mounted on the head, the water introduced into the water inlet may be not discharged to the nozzle of the water purifying apparatus. Thus, the user may recognize the state, in which the filter is separated, to mount the filter.

In addition, the shaft may include the water inlet blocking portion that shields the opened water inlet. When the filter is separated from the head, the shaft may rotate to be aligned with the water inlet and the water inlet blocking portion, thereby preventing the water introduced into the water inlet from being introduced into the shaft. Thus, in the state in which the filter is separated from the head, the water may not be discharged from the water outlet.

The sealing pad may be mounted on the outer surface of the water inlet blocking portion. The sealing pad may be provided between the water inlet and the water inlet blocking portion to prevent the water from leaking between the inner surface of the head and the outer surface of the shaft.

The shaft inlet and the shaft outlet, which define the filtering passage, may have the circular shape. Each of the shaft inlet and outlet and the circumferential surface of the shaft may be provided in the circular shape to maximize the water inflow or outflow area. Therefore, the flow rate of the water introduced or discharged through the water inlet or the water outlet may increase.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A water purifying apparatus comprising:
  a head that defines a water inlet and a water outlet, the head being configured to couple to a filter and to supply water from the water inlet to the filter to thereby discharge filtered water through the water outlet; and
  a shaft disposed inside the head and rotatably disposed between the water inlet and the water outlet, the shaft defining a filtering passage configured to connect the water inlet to the water outlet to thereby guide water from the water inlet to the water outlet through the filter,
  wherein the shaft comprises:
    a shaft inlet configured to fluidly communicate with the water inlet,
    a shaft outlet configured to fluidly communicate with the water outlet, the filtering passage being defined between the shaft inlet and the shaft outlet,
    a water inlet blocking portion disposed between the shaft inlet and the shaft outlet and configured to block an opening of the water inlet,
    a water outlet blocking portion disposed between the shaft inlet and the shaft outlet and configured to block an opening of the water outlet, and
    a sealing pad mounted to the water inlet blocking portion and configured to block the opening of the water inlet.

2. The water purifying apparatus according to claim 1, wherein the shaft inlet and the shaft outlet are configured to, based on the filter being coupled to the head, be aligned with the water inlet and the water outlet, respectively, to thereby allow introduction of water from the water inlet to the filter, and
  wherein the water inlet blocking portion and the water outlet blocking portion are configured to, based on the filter being separated from the head, be aligned with the water inlet and the water outlet, respectively, to thereby block introduction of water from the water inlet into the shaft.

3. The water purifying apparatus according to claim 1, wherein the water inlet blocking portion defines a recess portion recessed inward from a circumferential surface of the shaft.

4. The water purifying apparatus according to claim 3, wherein the sealing pad is inserted into the recess portion.

5. The water purifying apparatus according to claim 4, wherein the water inlet blocking portion comprises a protrusion that protrudes toward the sealing pad, and
  wherein the sealing pad has an inner surface that is in contact with the recess portion, the sealing pad defining a coupling groove that is recessed from the inner surface of the sealing pad and receives the protrusion.

6. The water purifying apparatus according to claim 5, wherein the sealing pad further has an outer surface that faces opposite to the inner surface of the sealing pad, the sealing pad further comprising a sealing portion that protrudes from and extends along a circumference of the outer surface of the sealing pad.

7. The water purifying apparatus according to claim 6, wherein the inner surface of the sealing pad has a flat shape, and
  wherein the outer surface of the sealing pad has a curved surface that is concave toward a center axis of the shaft.

8. The water purifying apparatus according to claim 7, wherein the sealing portion is disposed between the water inlet and the water inlet blocking portion.

9. The water purifying apparatus according to claim 1, wherein the water outlet blocking portion defines a recess portion recessed inward from a circumferential surface of the shaft.

10. The water purifying apparatus according to claim 9, wherein the sealing pad is inserted into the recess portion, and
  wherein the sealing pad comprises:
    an inner surface that is in contact with the recess portion,
    an outer surface that faces opposite to the inner surface, and
    a sealing portion that protrudes from and extends along a circumference of the outer surface.

11. The water purifying apparatus according to claim 1, wherein the shaft comprises:
  an upper part that includes the shaft inlet, the shaft outlet, the water inlet blocking portion, and the water outlet blocking portion; and
  a lower part that extends downward from a lower end of the upper part, and wherein the lower part of the shaft comprises:
a stepped portion that is stepped from the lower end of the upper part, and
an inner pipe that extends downward from a lower end of the stepped portion.

12. The water purifying apparatus according to claim 11, wherein the head comprises a body seating portion that is disposed inside the head and supports the stepped portion, and
wherein the water purifying apparatus further comprises a stepped portion O-ring disposed between an outer surface of the stepped portion and an inner surface of the head.

13. The water purifying apparatus according to claim 11, wherein the head comprises:
an upper body;
a lower body disposed below the upper body, the lower body having a bottom surface that defines an opening configured to accommodate the filter; and
an inner body disposed inside the head, at least a portion of the inner body being in contact with the shaft.

14. The water purifying apparatus according to claim 13, wherein the inner body is spaced apart from the inner pipe by a set distance, and
wherein a lower end of the inner body extends further downward relative to a lower end of the inner pipe.

15. The water purifying apparatus according to claim 1, wherein each of the shaft inlet and the shaft outlet has a circular shape.

16. The water purifying apparatus according to claim 1, wherein the shaft inlet, the shaft outlet, the water inlet blocking portion, and the water outlet blocking portion are arranged along a circumference of the shaft and spaced part from each other in a circumferential direction of the shaft.

17. The water purifying apparatus according to claim 16, wherein the water inlet blocking portion is disposed between the shaft inlet and the shaft outlet in the circumferential direction of the shaft, and
wherein the water outlet blocking portion is disposed between the shaft inlet and the shaft outlet in the circumferential direction of the shaft.

18. The water purifying apparatus according to claim 1, wherein the water inlet blocking portion and the water outlet blocking portion face each other in a radial direction of the shaft, and
wherein the shaft inlet and the shaft outlet face each other of the shaft.

19. The water purifying apparatus according to claim 16, wherein the shaft is configured to:
rotate relative to the head based on the filter being coupled to the head to thereby align the shaft inlet and the shaft outlet with the water inlet and the water outlet, respectively, and
rotate relative to the head based on the filter being separated from the head to thereby align the water inlet blocking portion and the water outlet blocking portion with the water inlet and the water outlet, respectively.

20. A refrigerator comprising the water purifying apparatus according to claim 1.

* * * * *